(12) United States Patent
Krietzman et al.

(10) Patent No.: US 8,558,113 B2
(45) Date of Patent: Oct. 15, 2013

(54) VERTICAL CABLE MANAGER

(75) Inventors: William Krietzman, Denver, CO (US);
Joshua James Young, Austin, TX (US);
D. Brian Donowho, Austin, TX (US)

(73) Assignee: Chatsworth Products, Inc., Westlake Village, CA (US)

( * ) Notice: Subject to any disclaimer, the term of this patent is extended or adjusted under 35 U.S.C. 154(b) by 0 days.

(21) Appl. No.: 13/007,723

(22) Filed: Jan. 17, 2011

(65) Prior Publication Data
US 2011/0180295 A1    Jul. 28, 2011

Related U.S. Application Data

(60) Provisional application No. 61/295,736, filed on Jan. 17, 2010, provisional application No. 61/295,737, filed on Jan. 17, 2010.

(51) Int. Cl.
*H01B 7/00* (2006.01)
*H02G 3/04* (2006.01)
*H02G 3/00* (2006.01)
*H02B 1/20* (2006.01)

(52) U.S. Cl.
USPC ............. 174/72 A; 174/100; 361/826

(58) Field of Classification Search
USPC ............ 211/26, 175, 183; 439/501, 527, 701, 439/719; 361/679.43, 679.58, 826; 174/68.1, 72 A, 100, 101, 481, 504, 95; 385/134, 135; 16/DIG. 32, 371, 261, 16/257, 268; 49/192, 193, 381, 382
See application file for complete search history.

(56) References Cited

U.S. PATENT DOCUMENTS

| | | | |
|---|---|---|---|
| 2,531,110 | A | 11/1950 | Cisler |
| 2,817,870 | A | 12/1957 | Howell |
| 2,921,607 | A | 1/1960 | Caveney |
| 3,008,177 | A | 11/1961 | Wooten |
| 3,403,220 | A | 9/1968 | Riedel et al. |
| 3,485,937 | A | 12/1969 | Caveney |
| 3,705,949 | A | 12/1972 | Weiss |
| 3,761,603 | A | 9/1973 | Hays et al. |

(Continued)

FOREIGN PATENT DOCUMENTS

| | | |
|---|---|---|
| AU | 322229 | 11/2008 |
| AU | 322230 | 11/2008 |

(Continued)

OTHER PUBLICATIONS

Information Disclosure Statement (IDS) Letter Regarding Common Patent Application(s), dated Mar. 16, 2011.

(Continued)

*Primary Examiner* — Hoa C Nguyen
*Assistant Examiner* — Binh Tran
(74) *Attorney, Agent, or Firm* — Tillman Wright, PLLC; James D. Wright; David R. Higgins

(57) ABSTRACT

A cable manager includes one or more cable manager units. Each cable manager unit includes a pair of side cable guides, each comprised of a plurality of finger-like projections extending forwardly from a support column. At least one of the pair of support columns has a socket arranged at a side thereof. Each cable manager unit further includes a separate midsection member capable of insertion into the socket for interconnecting the pair of side cable guides.

9 Claims, 31 Drawing Sheets

(56) References Cited

U.S. PATENT DOCUMENTS

| | | |
|---|---|---|
| 3,890,459 A | 6/1975 | Caveney |
| 3,906,146 A | 9/1975 | Taylor |
| 3,968,322 A | 7/1976 | Taylor |
| 4,046,957 A | 9/1977 | Taylor et al. |
| 4,136,257 A | 1/1979 | Taylor |
| 4,398,564 A | 8/1983 | Young et al. |
| 4,484,020 A | 11/1984 | Loof et al. |
| 4,497,411 A | 2/1985 | DeBortoli |
| D282,538 S | 2/1986 | Loof et al. |
| 4,613,174 A | 9/1986 | Berg et al. |
| 4,902,852 A | 2/1990 | Wuertz |
| 4,964,020 A | 10/1990 | Savage et al. |
| 4,974,289 A | 12/1990 | Piard |
| 5,024,251 A | 6/1991 | Chapman |
| 5,086,195 A | 2/1992 | Claisse |
| D326,200 S | 5/1992 | Allen et al. |
| 5,187,836 A | 2/1993 | Kim et al. |
| 5,235,136 A | 8/1993 | Santucci et al. |
| 5,323,916 A | 6/1994 | Salmon |
| 5,577,151 A * | 11/1996 | Hoffer .................. 385/135 |
| 5,602,364 A | 2/1997 | Ustin |
| 5,640,482 A | 6/1997 | Barry et al. |
| 5,675,934 A | 10/1997 | Park |
| 5,685,113 A | 11/1997 | Reuter et al. |
| 5,739,469 A * | 4/1998 | Lopez et al. ................ 174/72 A |
| 5,758,002 A | 5/1998 | Walters |
| 5,765,698 A | 6/1998 | Bullivant |
| 5,829,197 A | 11/1998 | Oh |
| 5,902,961 A | 5/1999 | Viklund et al. |
| 5,933,563 A | 8/1999 | Schaffer et al. |
| 5,940,937 A | 8/1999 | Churchill et al. |
| 5,942,729 A | 8/1999 | Carlson et al. |
| 5,971,509 A | 10/1999 | Deimen et al. |
| 6,047,838 A | 4/2000 | Rindoks et al. |
| 6,082,837 A | 7/2000 | Battochio et al. |
| 6,102,214 A | 8/2000 | Mendoza |
| 6,107,575 A | 8/2000 | Miranda |
| 6,107,576 A | 8/2000 | Morton et al. |
| 6,127,631 A | 10/2000 | Green et al. |
| 6,135,583 A | 10/2000 | Simon et al. |
| 6,142,594 A | 11/2000 | Benner et al. |
| 6,201,919 B1 | 3/2001 | Puetz et al. |
| D440,210 S | 4/2001 | Larsen et al. |
| 6,215,069 B1 | 4/2001 | Martin et al. |
| 6,261,026 B1 | 7/2001 | Conley et al. |
| 6,293,056 B1 | 9/2001 | He |
| 6,307,997 B1 | 10/2001 | Walters et al. |
| 6,318,680 B1 | 11/2001 | Benedict et al. |
| 6,321,917 B1 | 11/2001 | Mendoza |
| 6,347,714 B1 | 2/2002 | Fournier et al. |
| 6,365,834 B1 | 4/2002 | Larsen et al. |
| 6,401,940 B1 | 6/2002 | Hartel et al. |
| 6,403,885 B1 | 6/2002 | Baker et al. |
| 6,423,898 B1 * | 7/2002 | Croker .................. 174/50 |
| 6,437,243 B1 | 8/2002 | VanderVelde et al. |
| 6,437,244 B1 | 8/2002 | VanderVelde |
| D463,253 S | 9/2002 | Canty |
| 6,467,633 B1 | 10/2002 | Mendoza |
| 6,468,112 B1 | 10/2002 | Follingstad et al. |
| 6,489,565 B1 | 12/2002 | Krietzman et al. |
| 6,501,899 B1 | 12/2002 | Marrs et al. |
| D468,700 S | 1/2003 | Dagley et al. |
| D473,850 S | 4/2003 | Rouleau et al. |
| 6,584,267 B1 | 6/2003 | Caveney et al. |
| 6,590,785 B1 | 7/2003 | Lima et al. |
| 6,600,107 B1 | 7/2003 | Wright et al. |
| 6,605,782 B1 | 8/2003 | Krietzman et al. |
| 6,614,665 B2 | 9/2003 | Witty et al. |
| 6,614,978 B1 | 9/2003 | Caveney et al. |
| 6,647,197 B1 | 11/2003 | Marrs et al. |
| 6,702,125 B2 | 3/2004 | Hartel |
| 6,708,830 B2 | 3/2004 | Mendoza |
| 6,760,531 B1 | 7/2004 | Solheid et al. |
| 6,766,093 B2 | 7/2004 | McGrath et al. |
| 6,785,459 B2 | 8/2004 | Schmidt et al. |
| 6,796,437 B2 | 9/2004 | Krampotich et al. |
| 6,796,438 B2 | 9/2004 | Mendoza |
| 6,814,244 B1 | 11/2004 | Hathcock |
| 6,855,884 B2 | 2/2005 | Spagnoli et al. |
| 6,884,942 B2 | 4/2005 | McGrath et al. |
| 6,918,796 B2 | 7/2005 | Elliot et al. |
| D509,479 S | 9/2005 | DePaola |
| 6,946,605 B2 | 9/2005 | Levesque et al. |
| 6,964,588 B2 | 11/2005 | Follingstad et al. |
| 6,968,647 B2 | 11/2005 | Levesque et al. |
| 6,981,893 B2 | 1/2006 | Barker et al. |
| 7,000,784 B2 | 2/2006 | Canty et al. |
| 7,019,213 B1 | 3/2006 | McNutt et al. |
| 7,026,553 B2 | 4/2006 | Levesque et al. |
| 7,041,898 B2 | 5/2006 | Stempinski et al. |
| 7,041,912 B2 | 5/2006 | Kadrnoska et al. |
| 7,060,893 B1 | 6/2006 | Villi |
| 7,077,688 B2 | 7/2006 | Peng |
| 7,083,051 B2 | 8/2006 | Smith et al. |
| 7,119,282 B2 | 10/2006 | Krietzman et al. |
| 7,142,765 B2 | 11/2006 | Rapp et al. |
| 7,152,936 B2 | 12/2006 | Tarasewicz |
| 7,178,292 B2 | 2/2007 | Yamada |
| 7,178,679 B2 | 2/2007 | Canty et al. |
| D539,228 S | 3/2007 | Toikka et al. |
| D539,755 S | 4/2007 | Makwinski et al. |
| 7,220,150 B2 | 5/2007 | Follingstad et al. |
| 7,225,586 B2 | 6/2007 | Levesque et al. |
| 7,285,027 B2 | 10/2007 | McGrath et al. |
| 7,362,941 B2 | 4/2008 | Rinderer et al. |
| 7,378,046 B2 | 5/2008 | Canty et al. |
| 7,381,100 B2 | 6/2008 | Follingstad et al. |
| 7,408,121 B2 | 8/2008 | Halliday et al. |
| 7,417,188 B2 | 8/2008 | McNutt et al. |
| 7,425,678 B2 | 9/2008 | Adducci et al. |
| 7,427,713 B2 | 9/2008 | Adducci et al. |
| 7,437,048 B2 | 10/2008 | Farrell et al. |
| 7,458,859 B2 | 12/2008 | McGrath et al. |
| 7,485,803 B2 | 2/2009 | Adducci et al. |
| 7,495,169 B2 | 2/2009 | Adducci et al. |
| 7,504,581 B2 | 3/2009 | Adducci et al. |
| D592,938 S | 5/2009 | Pae et al. |
| D596,928 S | 7/2009 | Lawrence et al. |
| 7,565,051 B2 | 7/2009 | Vongseng |
| D602,764 S | 10/2009 | Pae et al. |
| 7,637,771 B2 | 12/2009 | Laursen |
| D611,326 S | 3/2010 | Alaniz et al. |
| 7,718,891 B2 | 5/2010 | Adducci et al. |
| 7,762,405 B2 | 7/2010 | Vogel et al. |
| 7,772,489 B2 | 8/2010 | Adducci et al. |
| 7,778,513 B2 | 8/2010 | Rinderer et al. |
| 7,795,532 B2 | 9/2010 | Walker |
| 7,804,685 B2 | 9/2010 | Krietzman |
| 7,813,146 B1 | 10/2010 | Phan |
| D629,289 S | 12/2010 | Krietzman et al. |
| D630,167 S | 1/2011 | Donowho |
| 7,874,433 B2 | 1/2011 | Levesque et al. |
| 7,880,084 B2 | 2/2011 | Adducci et al. |
| 7,893,356 B2 | 2/2011 | Garza et al. |
| D635,935 S | 4/2011 | Donowho |
| D637,065 S | 5/2011 | Krietzman et al. |
| D637,066 S | 5/2011 | Krietzman et al. |
| 7,939,763 B2 | 5/2011 | Jones et al. |
| D640,528 S | 6/2011 | Krietzman et al. |
| 7,973,242 B2 | 7/2011 | Jones et al. |
| 7,974,105 B2 | 7/2011 | Dean, Jr. et al. |
| 7,999,183 B2 | 8/2011 | Garza et al. |
| 8,003,890 B2 | 8/2011 | Donowho et al. |
| 8,035,965 B2 | 10/2011 | Adducci et al. |
| D651,570 S | 1/2012 | Donowho et al. |
| D653,623 S | 2/2012 | Young et al. |
| 8,138,419 B2 | 3/2012 | Garza et al. |
| 8,263,867 B2 | 9/2012 | Garza et al. |
| 8,273,989 B2 | 9/2012 | Garza et al. |
| 8,330,043 B2 | 12/2012 | Alaniz et al. |
| 8,395,046 B2 | 3/2013 | Nicewicz et al. |
| 8,411,465 B2 | 4/2013 | Dean, Jr. et al. |
| 8,437,147 B2 | 5/2013 | Dean, Jr. et al. |
| 2001/0022231 A1 | 9/2001 | Dyer |

(56) References Cited

U.S. PATENT DOCUMENTS

| | | |
|---|---|---|
| 2002/0197045 A1 | 12/2002 | Schmidt et al. |
| 2003/0020379 A1 | 1/2003 | Larsen et al. |
| 2003/0037953 A1 | 2/2003 | Sarkinen et al. |
| 2003/0072551 A1 | 4/2003 | Douglas et al. |
| 2003/0118311 A1 | 6/2003 | Thibault et al. |
| 2003/0190036 A1 | 10/2003 | Mandoza |
| 2004/0007372 A1 | 1/2004 | Krietzman et al. |
| 2004/0050808 A1 | 3/2004 | Krampotich et al. |
| 2004/0094491 A1 | 5/2004 | Smith et al. |
| 2004/0146266 A1 | 7/2004 | Solheid et al. |
| 2004/0173545 A1 | 9/2004 | Canty et al. |
| 2004/0226900 A1* | 11/2004 | Canty et al. ............... 211/26 |
| 2005/0078437 A1 | 4/2005 | Chuang et al. |
| 2005/0103517 A1 | 5/2005 | Canepa |
| 2005/0115152 A1 | 6/2005 | Levesque et al. |
| 2005/0115736 A1 | 6/2005 | Levesque et al. |
| 2005/0115737 A1 | 6/2005 | Levesque et al. |
| 2005/0221683 A1 | 10/2005 | McGrath et al. |
| 2005/0247650 A1 | 11/2005 | Vogel et al. |
| 2006/0054336 A1 | 3/2006 | McNutt et al. |
| 2006/0059802 A1 | 3/2006 | McNutt et al. |
| 2006/0091086 A1 | 5/2006 | Canty et al. |
| 2006/0162948 A1 | 7/2006 | Rinderer et al. |
| 2007/0210679 A1 | 9/2007 | Adducci et al. |
| 2007/0210680 A1 | 9/2007 | Appino et al. |
| 2007/0210681 A1 | 9/2007 | Adducci et al. |
| 2007/0210683 A1 | 9/2007 | Adducci et al. |
| 2007/0210686 A1 | 9/2007 | Adducci et al. |
| 2007/0212010 A1 | 9/2007 | Caveney et al. |
| 2007/0221393 A1 | 9/2007 | Adducci et al. |
| 2007/0249237 A1 | 10/2007 | Follingstad et al. |
| 2007/0293138 A1 | 12/2007 | Adducci et al. |
| 2008/0074849 A1 | 3/2008 | Adducci et al. |
| 2008/0130262 A1* | 6/2008 | Rinderer et al. ............ 361/826 |
| 2008/0151524 A1 | 6/2008 | Kelly et al. |
| 2008/0174217 A1 | 7/2008 | Walker |
| 2009/0014614 A1 | 1/2009 | Warmoth et al. |
| 2009/0090533 A1* | 4/2009 | Jones et al. ............... 174/95 |
| 2009/0090538 A1 | 4/2009 | Jones et al. |
| 2009/0093169 A1 | 4/2009 | McGrath et al. |
| 2009/0190300 A1* | 7/2009 | Takao et al. ............ 361/679.43 |
| 2009/0190307 A1 | 7/2009 | Krietzman |
| 2009/0224110 A1 | 9/2009 | Donowho et al. |
| 2009/0236117 A1* | 9/2009 | Garza et al. .............. 174/100 |
| 2009/0273915 A1 | 11/2009 | Dean, Jr. et al. |
| 2009/0283488 A1 | 11/2009 | McMillan et al. |
| 2010/0061059 A1 | 3/2010 | Krietzman et al. |
| 2010/0101820 A1 | 4/2010 | Alaniz et al. |
| 2010/0122830 A1 | 5/2010 | Garza et al. |
| 2010/0126750 A1 | 5/2010 | Garza et al. |
| 2010/0126751 A1 | 5/2010 | Garza et al. |
| 2010/0193754 A1 | 8/2010 | Garza et al. |
| 2010/0200707 A1 | 8/2010 | Garza et al. |
| 2011/0019362 A1 | 1/2011 | Krietzman |
| 2011/0056895 A1 | 3/2011 | Tichy |
| 2011/0174534 A1 | 7/2011 | Krietzman et al. |
| 2011/0211328 A1 | 9/2011 | Dean et al. |
| 2011/0211329 A1 | 9/2011 | Dean et al. |
| 2011/0287704 A1 | 11/2011 | Lewis, II et al. |
| 2011/0290553 A1 | 12/2011 | Behrens et al. |
| 2012/0013229 A1 | 1/2012 | Krietzman |

FOREIGN PATENT DOCUMENTS

| | | |
|---|---|---|
| AU | 322231 | 11/2008 |
| AU | 322233 | 11/2008 |
| AU | 323811 | 1/2009 |
| AU | 323812 | 1/2009 |
| AU | 332167 | 8/2010 |
| AU | 332168 | 8/2010 |
| CN | ZL200830139492.8 | 10/2009 |
| CN | ZL200830139487.7 | 11/2009 |
| CN | ZL200830139490.9 | 11/2009 |
| CN | ZL200830139491.3 | 11/2009 |
| CN | ZL200830139488.1 | 2/2010 |
| CN | 102177633 A | 9/2011 |
| EC | 000554316-0001 | 7/2006 |
| EC | 000968607-0001 | 7/2008 |
| EC | 000968607-0002 | 7/2008 |
| EC | 000968607-0003 | 7/2008 |
| EC | 000968607-0004 | 7/2008 |
| EC | 000968607-0005 | 7/2008 |
| EC | 000968607-0006 | 7/2008 |
| EC | 000968607-0008 | 7/2008 |
| EC | 001226088-001 | 7/2010 |
| EC | 001226088-002 | 7/2010 |
| GB | 2468823 A | 9/2010 |
| GB | 2468823 B | 10/2012 |
| IN | 216979 | 6/2009 |
| IN | 216981 | 7/2009 |
| IN | 216983 | 7/2009 |
| IN | 216984 | 7/2009 |
| IN | 216982 | 8/2009 |
| IN | 216980 | 3/2010 |
| MX | 27994 | 4/2009 |
| MX | 27995 | 4/2009 |
| MX | 27996 | 4/2009 |
| MX | 29091 | 8/2009 |
| SE | 535066 C2 | 4/2012 |
| WO | 0101534 A1 | 1/2001 |
| WO | 0174091 A2 | 10/2001 |
| WO | 2005112477 A1 | 11/2005 |
| WO | 2009089008 A2 | 7/2009 |
| WO | 2009089306 A1 | 7/2009 |
| WO | 2009089307 A2 | 7/2009 |
| WO | 2009143193 A2 | 11/2009 |
| WO | 2009089307 A3 | 12/2009 |
| WO | 2009143193 A3 | 3/2010 |
| WO | 2010028384 A2 | 3/2010 |
| WO | 2010028384 A3 | 5/2010 |
| WO | 2009089203 A4 | 6/2011 |
| WO | 2011088430 A2 | 7/2011 |
| WO | 2011088438 A2 | 7/2011 |
| WO | 2011088430 A3 | 11/2011 |
| WO | 2011088438 A3 | 11/2011 |

OTHER PUBLICATIONS

"International Search Report" and "Written Opinion of the International Search Authority" (Australian Patent Office) in Chatsworth Products, Inc. et al., International Patent Application Serial No. PCT/US2008/030368, dated Apr. 8, 2009, 20 pages.

"International Search Report" and "Written Opinion of the International Search Authority" (Korean Intellectual Property Office) in Chatsworth Products, Inc. et al., International Patent Application Serial No. PCT/US2009/030369, dated Oct. 12, 2009, 9 pages.

"International Search Report" and "Written Opinion of the International Search Authority" (Korean Intellectual Property Office) in Chatsworth Products, Inc. et al., International Patent Application Serial No. PCT/US2009/044577, dated Jan. 12, 2010, 7 pages.

"International Search Report" and "Written Opinion of the International Search Authority" (European Patent Office) in Corning Cable Systems LLC, International Patent Application Serial No. PCT/US2009/000075, dated Aug. 7, 2009, 21 pages.

"International Search Report" and "Written Opinion of the International Search Authority" (Korean Intellectual Property Office) in Chatsworth Products, Inc. et al., International Patent Application Serial No. PCT/US2009/056256, dated Apr. 7, 2010, 7 pages.

Information Disclosure Statement (IDS) Letter Regarding Common Patent Application(s), dated May 5, 2012.

Office Action dated Feb. 24, 2011 in Swedish Patent Application No. 1050712-7, and English translation thereof, 12 pages.

Information Disclosure Statement (IDS) Letter Regarding Common Patent Application(s), dated Jul. 22, 2011.

Information Disclosure Statement (IDS) Letter Regarding Common Patent Application(s), dated Aug. 2, 2012.

Information Disclosure Statement (IDS) Letter Regarding Common Patent Application(s), dated Feb. 5, 2012.

"International Search Report" and "Written Opinion" of the International Search Authority (Korean Intellectual Property Office) in

(56) References Cited

OTHER PUBLICATIONS

Chatsworth Products, Inc. et al., International Patent Application Serial No. PCT/US2011/021484, dated Sep. 29, 2011, 7 pages.
"International Search Report" and "Written Opinion" of the International Search Authority (Korean Intellectual Property Office) in Chatsworth Products, Inc. et al., International Patent Application Serial No. PCT/US2011/021457, dated Sep. 28, 2011, 8 pages.
Information Disclosure Statement (IDS) Letter Regarding Common Patent Application(s), dated Oct. 30, 2012.
Information Disclosure Statement (IDS) Letter Regarding Common Patent Application(s), dated Jan. 14, 2013.

* cited by examiner

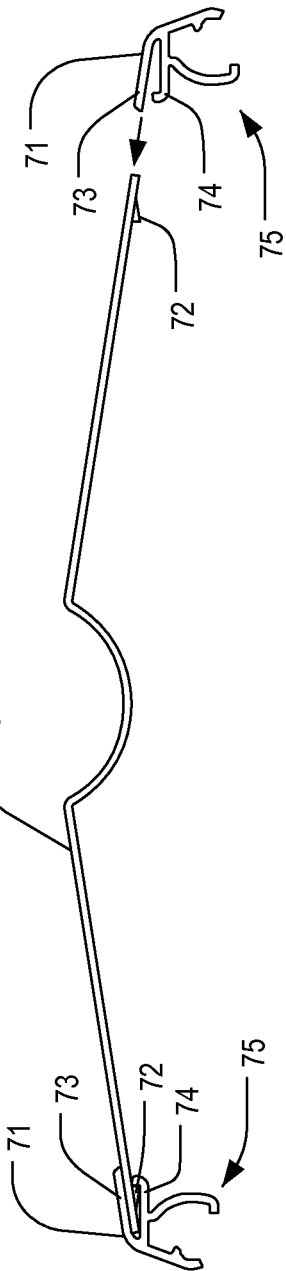

VERTICAL CABLE MANAGER

CROSS-REFERENCE TO RELATED APPLICATION

The present application is a U.S. nonprovisional patent application of, and claims priority under 35 U.S.C. §119(e) to, U.S. provisional patent application Ser. No. 61/295,736, filed Jan. 17, 2010 and entitled "VERTICAL CABLE MANAGER," which is expressly incorporated by reference herein. Additionally, the following U.S. patent applications, and any publication thereof, are expressly incorporated by reference herein:
  (a) U.S. provisional patent application Ser. No. 61/295,737, filed Jan. 17, 2010 and entitled "HORIZONTAL CABLE MANAGER;" and
  (b) U.S. patent application Ser. No. 13/007,724, filed Jan. 17, 2011 and entitled "HORIZONTAL CABLE MANAGER," which published as U.S. Patent Application Publication No. US 2011/0174534 A1 on Jul. 21, 2011.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention relates generally to cable management systems for telecommunications cables, and, in particular, to vertical cable managers that may be assembled quickly and with minimal tools.

2. Background

Racks, frames, cabinets and the like for supporting computer and other electronic equipment are very well known. Similarly, raceways for routing cables and wires to and from that equipment are likewise well known. In particular, a number of raceways have been proposed for routing cables, wires and the like (generally referred to hereinafter as "cables") vertically through or adjacent to equipment racks, frames, cabinets and the like (generally referred to hereinafter as "mounting fixtures"). Such raceways may be used to route cables vertically to equipment mounted or otherwise supported on a mounting fixture from other equipment on the mounting fixture, from an overhead or underfloor raceway, or the like. These cables are generally routed in the vertical direction to a point adjacent to the desired equipment and then routed in the horizontal direction to the desired equipment.

An important characteristic of such raceways is the presence of a plurality of openings in the sides of the raceway through which cables may be routed, thereby facilitating more convenient access between the equipment and the interior of the raceway. For example, U.S. Pat. No. 2,921,607 to Caveney, U.S. Pat. No. 3,705,949 to Weiss, commonly-assigned U.S. Pat. No. 7,119,282 to Krietzman et al., and U.S. Pat. No. 7,285,027 to McGrath et al. each disclose a covered wiring duct or wireway which includes side walls having a series of finger-like projections separated by openings. The cables may be routed through the openings by bending them around the projections, thus allowing the cables to be routed with relative precision, and preventing cables from hanging loosely across the face of the rack itself. A gap at the distal ends of each pair of adjacent projections permits cables to be inserted into each respective opening. The gap is narrower than the opening, thus aiding in the retention of the cables within the opening. The distal ends of all the projections may then be covered by a cover, thus providing further retention capability.

It is often advantageous to provide a cable raceway having a front portion and a rear portion wherein two separate channels are established, either within the raceway itself or through the use of additional accessories. In such raceways, the separate channels are commonly established by a partition or "midsection," often with passthrough openings therein. Until recently, such products utilized a fixed midsection that is attached to the vertical side rails in one position only. The fixed midsection provides strength and rigidity to the total structure. One downside of a fixed midsection is that it reduces cable capacity. Furthermore, installers find it difficult to position cables front-to-back, and lashing bars and spools are not flexibly available. For example, U.S. Pat. No. 7,220,150 to Follingstad et al. discloses the use of spools, but the positions of the spools are relatively fixed.

More recently, more flexible midsections have been provided. For example, midsection members that are vertically and horizontally repositionable and horizontally adjustable have been proposed in commonly-assigned U.S. patent application Ser. No. 12/350,216 to Garza et al. However, assembling and disassembling vertical cable managers using such midsection members is time-consuming and requires the use of tools, and the components themselves are expensive to manufacture. Furthermore, such cable managers and/or their components are bulky, making shipment more costly and otherwise problematic. Thus, a need exists for an improved vertical cable manager.

SUMMARY OF THE PRESENT INVENTION

The present invention comprises a cable manager, and particularly a vertical cable manager.

Broadly defined, the present invention according to one aspect is a cable manager including: one or more cable manager units, each having a pair of side cable guides; and a separate midsection member capable of insertion into at least one of the pair of side cable guides.

In a feature of this aspect, the cable manager further includes a door for attachment at the ends of the cable guides.

In another feature of this aspect, two or more cable manager units are connected together with at least one splice plate.

In another feature of this aspect, each cable guide includes a plurality of T-shaped projections extending forwardly from a vertical support column. In further features, a pair of adjacent T-shaped projections defines a cable ring formed by respective shafts and crosspieces of the pair of T-shaped projections; and each T-shaped projection has ribs for providing the projection with a reinforced construction.

In another feature of this aspect, each cable guide includes a midsection member socket for receipt and retention of an end of the midsection member. In a further feature, the midsection member socket has a large taper such that the width of the socket at the entrance is wider than that of the midsection member.

Broadly defined, the present invention according to another aspect is a midsection member for a cable manager including a web and a pair of flanges at opposite ends of the web, wherein the web includes: an alignment slot at an end thereof for positioning the midsection member vertically within a corresponding socket of the cable manager; and one or more alignment bosses for positioning the midsection member laterally within the corresponding socket of the cable manager.

In a feature of this aspect, the web further includes one or more cable guide locking holes for engaging with cable guide locking tabs of the cable manager, wherein, upon engagement, the midsection member is retained in the socket of the cable manager.

In another feature of this aspect, the web further includes one or more accessory attachment apertures.

Broadly defined, the present invention according to another aspect is a splice plate for connecting side cable guides of a cable manager together, the splice plate including an elongate plate having a notch at each end thereof, wherein each notch includes one or more locking catches.

In a feature of this aspect, the splice plate is adapted for receipt by a side cable guide, whereby the one or more locking catches at one end of the elongate plate engage with a locking tab of the side cable guide.

In another feature of this aspect, each end of the elongate plate is secured to one of the pair of side cable guides, thereby securing the side cable guides together.

Broadly defined, the present invention according to another aspect is a door for a cable manager, including a center panel and a pair of separate edge pieces.

In a feature of this aspect, each edge piece includes a hinge structure and a pair of fingers that define a channel for receipt of an edge of the central panel. In further features, the hinge structure is adapted to facilitate attachment of the door to one or more hinge bosses of a side cable guide; the hinge structure includes two arms that define a hinge channel for engagement with the one or more hinge bosses; and the door is adapted to be opened along either side thereof by detaching the hinge structure from the one or more hinge bosses at one side of the door and rotating the door about the hinge bosses at the opposite of the door.

Broadly defined, the present invention according to another aspect is a cable management projection having crescent-shaped reinforcement walls.

Broadly defined, the present invention according to another aspect is a cable management structure having an accessory mounting aperture defining a T-shaped slot for receiving a head of a hex-headed bolt.

In a feature of this aspect, the T-shaped slot is adapted to prevent the hex-headed bolt from rotation therein.

Broadly defined, the present invention according to one aspect is a cable manager that includes two or more vertical cable manager units stacked on top of each other to create a modular vertical cable manager.

In a feature of this aspect, the vertical cable manager units are connected to each other with a splice plate.

In another feature of this aspect, the cable manager units have different lengths.

Broadly defined, the present invention according to another aspect includes a cable manager that includes one or more cable manager units. Each cable manager unit includes a pair of side cable guides, each comprised of a plurality of finger-like projections extending forwardly from a support column. At least one of the pair of support columns has a socket arranged at a side thereof. Each cable manager unit further includes a separate midsection member capable of insertion into the socket for interconnecting the pair of side cable guides.

In features of this aspect, at least one of the finger-like projections may include at least one crescent-shaped reinforcement wall; at least one of the finger-like projections may have a U-shaped cross-section; the finger-like projections of each side cable guide may be arranged in a row such that adjacent finger-like projections are spaced apart by approximately 1 RMU; the finger-like projections may include T-shaped projections each having a shaft and a crosspiece; a pair of adjacent T-shaped projections may define a cable ring formed by respective shafts and crosspieces of the pair of T-shaped projections; the cable ring may include a gap between ends of the respective crosspieces, thereby permitting insertion of a cable into the cable ring; and, with respect to each side cable guide, the finger-like projections may be integrally formed with the support column.

In other features of this aspect, each socket may have a large taper such that the width of an entrance thereof is wider than the width of the midsection member and the interior of the socket is narrower than the entrance; the midsection member may include a web having flanges at opposite sides thereof; the flanges may each have a closed profile; the web may include at least one alignment slot at an end thereof and extending inwardly, the alignment slot being adapted to fit over a shelf in the at least one socket; the web may include at least one alignment boss disposed at or near an end thereof for positioning the midsection member laterally within the at least one socket; the web may include at least one locking aperture disposed at or near an thereof for engagement with a locking tab within the at least one socket, thereby retaining the midsection member therein; the locking tab may be beveled to permit the midsection member to be snap fit; and the midsection member may be removable from the at least one socket by depressing the locking tab.

In other features of this aspect, two cable manager units may be stacked on top of one another in an end-to-end relationship and connected together with at least one splice plate, thereby forming a modular cable manager; the two cable manager units may have different lengths; the side cable guides at one side of the modular cable manager may each include a plurality of tabs defining a receptacle for receiving an end of the at least one splice plate; the side cable guides at one side of the modular cable manager may each include a lock tab disposed thereon that corresponds with slots at opposite ends of the at least one splice plate, wherein the lock tab is adapted to be deflectable until the at least one splice plate is fully seated; the at least one splice plate may include a locking catch, at each end thereof, for hooking around a respective locking tab; the at least one splice plate may be removable from the side cable guides by depressing the locking tabs; and the splice plate may be adapted to permit tool-less assembly of the modular cable manager.

In other features of this aspect, at least one of the side cable guides may include an accessory mounting aperture defining a T-shaped slot for receiving a head of a hex-headed bolt; and the T-shaped slot may be adapted to prevent the hex-headed bolt from rotation therein.

In still other features of this aspect, at least one of the finger-like projections may include a hinge boss disposed at an end thereof; the cable manager may further comprise a door, wherein the door has a center panel and a hinge structure along at least one edge thereof to receive one or more hinge bosses, thereby facilitating rotatable attachment of the door to the side cable guides; the hinge structure may be integral with the door; the hinge structure may be integral with the center panel; the hinge structure may be a separate component attachable to the center panel; the hinge structure may include two fingers that define a channel to receive an edge of the center panel; the hinge structure may be snap-fitted to the center panel; the hinge structure and center panel may be composed of different materials; the hinge structure may include an inner arm having a semi-cylindrical inner surface adapted to rotate around a portion of the at least one hinge boss; the hinge structure may include a retaining stop at a distal end thereof for retaining the door at an open position when the retaining stop reaches and engages a cam arranged at a distal end of the at least one hinge boss; and the door may be adapted to be opened along either side thereof by detaching the hinge structure from the at least one hinge boss at one side of the door and rotating the door about another at least one hinge boss at the opposite of the door.

Broadly defined, the present invention according to another aspect includes a cable manager that includes one or more cable manager units. Each cable manager unit includes a pair of side cable guides, at least one hinge boss on each of the pair of side cable guides, and a door. Each side cable guide is comprised of a plurality of generally T-shaped projections, each having a shaft and a crosspiece, extending forwardly from a support column. Each hinge boss is disposed at the end of a respective one of the generally T-shaped projections. The door has a center panel and a hinge structure along edges thereof to receive one or more of the hinge bosses, thereby facilitating rotatable attachment of the door to the side cable guide. The door is adapted to be opened along either side thereof by detaching the hinge structure from the at least one hinge boss at one side of the door and rotating the door about another at least one hinge boss at the opposite of the door.

In features of this aspect, the hinge structure may be integral with the door; the hinge structure may be integral with the center panel; the hinge structure may be a separate component attachable to the center panel; the hinge structure may include two fingers that define a channel to receive an edge of the center panel; the hinge structure may be snap-fitted to the center panel; the hinge structure and center panel may be composed of different materials; the hinge structure may include an inner arm having a semi-cylindrical inner surface adapted to rotate around a portion of the at least one hinge boss; and the hinge structure may include a retaining stop at a distal end thereof for retaining the door at an open position when the retaining stop reaches and engages a cam arranged at a distal end of the at least one hinge boss.

In other features of this aspect, at least one of the generally T-shaped projections may include at least one crescent-shaped reinforcement wall; at least one of the generally T-shaped projections may have a U-shaped cross-section; the generally T-shaped projections of each side cable guide may be arranged in a row such that adjacent T-shaped projections are spaced apart by approximately 1 RMU; a pair of adjacent T-shaped projections may define a cable ring formed by respective shafts and crosspieces of the pair of T-shaped projections; the cable ring may include a gap between ends of the respective crosspieces, thereby permitting insertion of a cable into the cable ring; and, with respect to each side cable guide, the generally T-shaped projections may be integrally formed with the support column.

In other features of this aspect, the cable manager may further include a separate midsection member for interconnecting the pair of side cable guides; the midsection member may be adapted to be received in sockets arranged in the pair of side cable guides; each socket may have a large taper such that the width of an entrance thereof is wider than the width of the midsection member and the interior of the socket is narrower than the entrance; the midsection member may include a web having flanges at opposite sides thereof; the flanges may each have a closed profile; the web may include at least one alignment slot at an end thereof and extending inwardly, the alignment slot being adapted to fit over a shelf in each socket; the web may include at least one alignment boss disposed at or near an end thereof for positioning the midsection member laterally within each socket; the web may include at least one locking aperture disposed at or near an end thereof for engagement with a locking tab within each socket, thereby retaining the midsection member therein; the locking tab may be beveled to permit the midsection member to be snap fit; and the midsection member may be removable from the each socket by depressing the corresponding locking tab.

In other features of this aspect, two cable manager units may be stacked on top of one another in an end-to-end relationship and connected together with at least one splice plate, thereby forming a modular cable manager; the two cable manager units may have different lengths; the side cable guides at one side of the modular cable manager may each include a plurality of tabs defining a receptacle for receiving an end of the at least one splice plate; the side cable guides at one side of the modular cable manager may each include a lock tab disposed thereon that corresponds with slots at opposite ends of the at least one splice plate, wherein the lock tab is adapted to be deflectable until the at least one splice plate is fully seated; the at least one splice plate may include a locking catch at each end thereof, for hooking around a respective locking tab; the at least one splice plate may be removable from the side cable guides by depressing the locking tabs; and the splice plate may be adapted to permit tool-less assembly of the modular cable manager.

In still other features of this aspect, at least one of the side cable guides may include an accessory mounting aperture defining a T-shaped slot for receiving a head of a hex-headed bolt; and the T-shaped slot may be adapted to prevent the hex-headed bolt from rotation therein.

Broadly defined, the present invention according to another aspect includes a modular cable manager that includes a pair of cable manager units and at least one splice plate. Each cable manager unit includes a pair of sides, each having opposed first and second ends, and a midsection member connecting the pair of sides together, thereby forming a cable trough. The at least one splice plate interconnects the first end of a side in a first of the cable manager units to the second end of a side in a second of the cable manager units such that the respective cable troughs of the pair of cable manager units are contiguous with one another.

In features of this aspect, each side may be a side cable guide that includes a plurality of finger-like projections extending forwardly from a support column; and the finger-like projections may include T-shaped projections each having a shaft and a crosspiece.

In other features of this aspect, at least one of the sides may include a socket arranged therein, and the midsection member may be a separate structure that is capable of insertion into the socket for interconnecting the respective pair of cable manager unit sides; and each side may be a side cable guide that includes a plurality of finger-like projections extending forwardly from a support column, and the socket may be arranged in a side of one of the support columns.

In other features of this aspect, cable manager units of the pair of cable manager units may be stacked on top of one another in an end-to-end relationship, thereby forming a vertical cable manager; and the cable manager units of the pair of cable manager units may have different lengths.

In other features of this aspect, a first receptacle may be defined in at least the first end of the first cable manager unit and a second receptacle may be defined in at least the second end of the second cable manager unit, each receptacle adapted to receive an end of one of the at least one splice plate; each receptacle may be at least partially defined by a plurality of tabs; a slot may be arranged in each end of the splice plate to interact with a respective receptacle; each receptacle may include a lock tab disposed therein to correspond with a respective slot in the splice plate; the lock tab may be adapted to be deflectable until the at least one splice plate is fully seated within the receptacle; the at least one splice plate may include a locking catch, at each end thereof, for hooking around a respective locking tab; and the at least one splice plate may be removable from the cable manager unit sides by depressing the locking tabs.

In still another feature of this aspect, the at least one splice plate may be adapted to permit tool-less assembly of the modular cable manager.

Broadly defined, the present invention according to another aspect includes a midsection member for interconnecting a pair of side cable guides of a cable manager. The midsection member includes a web and a pair of flanges at opposite edges of the web. The web includes a pair of alignment slots at opposite ends thereof and extending inwardly, the alignment slots being adapted to fit over a shelf in a corresponding socket in each of the pair of side cable guides, and one or more alignment bosses for positioning the midsection member laterally within the sockets.

In features of this aspect, the web may further include one or more locking apertures for engaging with locking tabs of the side cable guides, wherein, upon engagement, the midsection member is retained in the sockets; the locking tabs may be beveled to permit the web to be snap fit into the sockets; the midsection member may be removable from the sockets by depressing the locking tabs; the web may further include one or more accessory attachment apertures; and the flanges may each have a closed profile.

Broadly defined, the present invention according to another aspect includes a splice plate for a cable manager. The splice plate includes an elongate plate having opposite ends, and a notch at each of the opposite ends. Each notch includes one or more locking catches for engaging a locking tab at an end of a side cable guide. Upon engaging the respective locking tabs in a pair of side cable guides, the locking catches secure the side cable guides in an end-to-end relationship with one another, thereby interconnecting the side cable guides.

In features of this aspect, the at least one splice plate may be removable from the side cable guides by depressing the locking tabs; and the elongate plate may be adapted to permit tool-less securement of the side cable guides to one another.

Broadly defined, the present invention according to another aspect includes a door for a cable manager that includes a center panel and a pair of edge portions. Each edge portion defines a hinge structure adapted to facilitate attachment of the door to one or more hinge bosses at distal ends of projections of a side cable guide. Each hinge structure includes two arms that define a hinge channel for rotatable engagement with respect to the one or more hinge bosses. The hinge structure includes a retaining stop adapted to retain the door at an open position when the retaining stop reaches and engages a cam arranged at a distal end of the one or more hinge bosses.

In features of this aspect, the center panel and the pair of edge portions are integral with one another; the center panel may be separable from the pair of edge portions; each of the pair of edge portions may include a pair of fingers that define a channel for receipt of an edge of the central panel; the center panel and the edge portions may be composed of different materials; and the door may be adapted to be opened along either side thereof.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, which are not necessarily to scale, wherein:

FIG. 14 is a profile view of an end of an alternative door for use in one or more preferred embodiments of the present invention;

FIG. 15 is a profile view of an end of one of the doors of FIG. 4, shown in a partially disassembled state;

DETAILED DESCRIPTION

Figure 1:
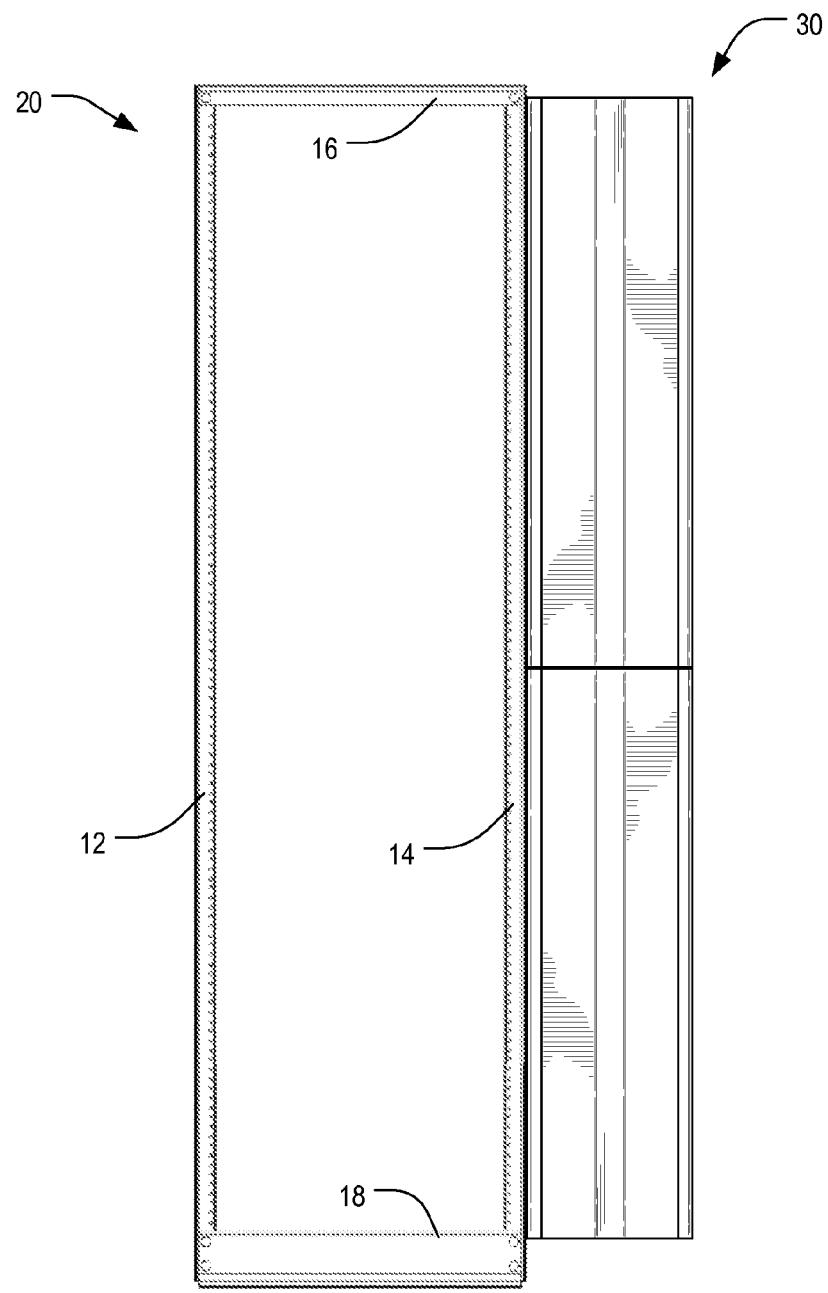
FIG. 1 is a front plan view of a mounting fixture system utilizing a vertical cable manager in accordance with a first preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of one or more preferred embodiment(s) is merely exemplary in nature and is in no way intended to limit the invention, its application, or uses.

FIG. 1 is a front plan view of a mounting fixture system 10 utilizing a vertical cable manager 30 in accordance with a first preferred embodiment of the present invention. As shown, the system 10 includes a conventional two-post mounting rack 20, next to which is disposed the vertical cable manager 30. Each two-post mounting rack 20 includes a pair of vertical support members 12,14, connected at their upper ends by a pair of upper cross-members 16 and at their lower ends by a pair of lower cross-members 18. The posts 12,14 are arranged to support a variety of electronic equipment, accessories and the like, all as is well known.

It will be apparent to the Ordinary Artisan that the arrangement illustrated in FIG. 1 may be a preferred implementation of one or more of the vertical cable managers described and illustrated herein. However, it will be appreciated that the vertical cable manager of the present invention may be utilized with a variety of mounting fixtures, for example including mounting fixtures formed from four support posts that may or may not be covered by panels to form an enclosure; and that mounting fixtures may be alternatively located on one or both sides of the cable manager 30, or alternatively may be used in isolation, as described below.

Figure 2A:
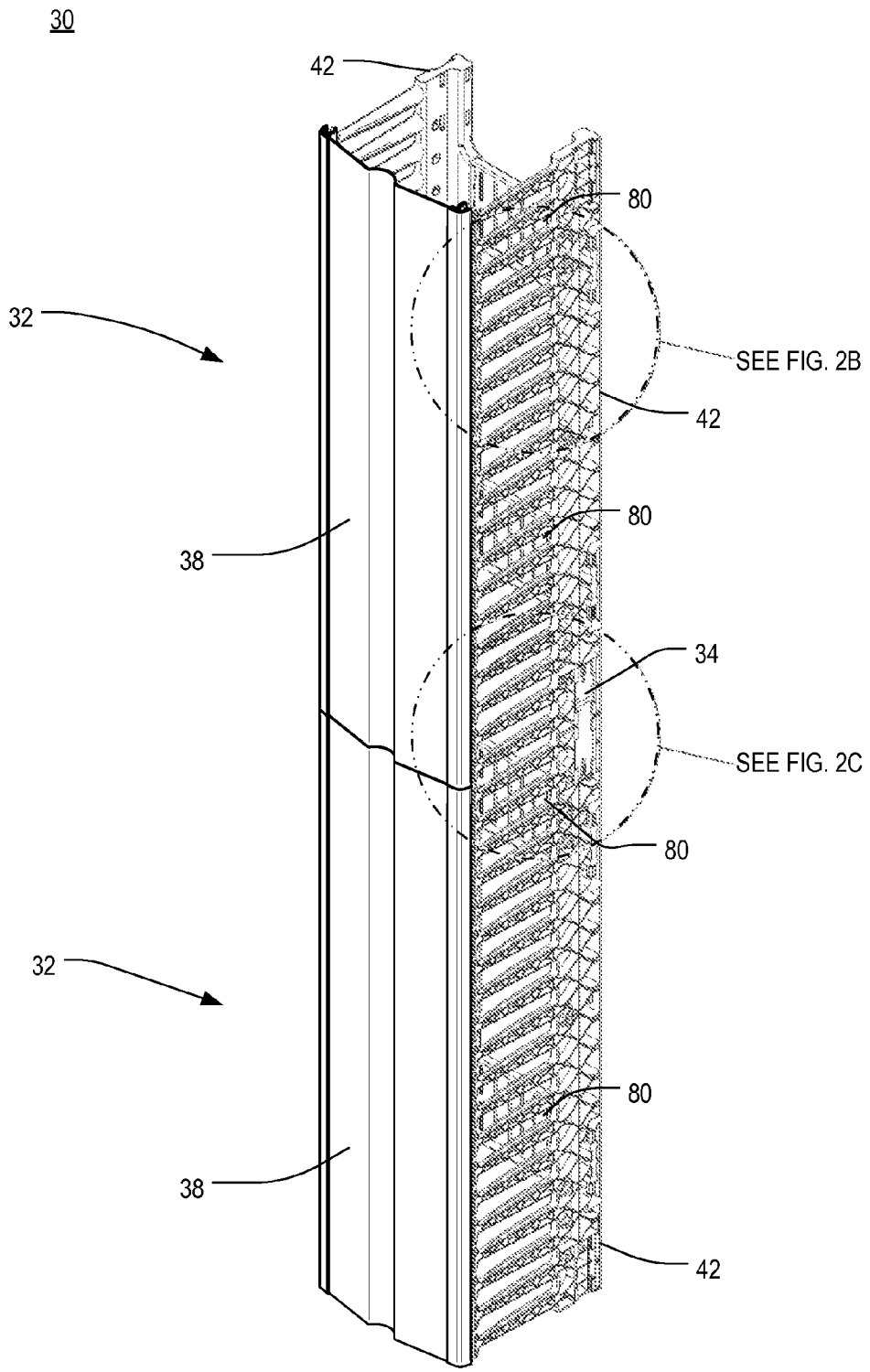
FIG. 2A is a front isometric view of the vertical cable manager of FIG. 1, shown in isolation.
Figure 2B:
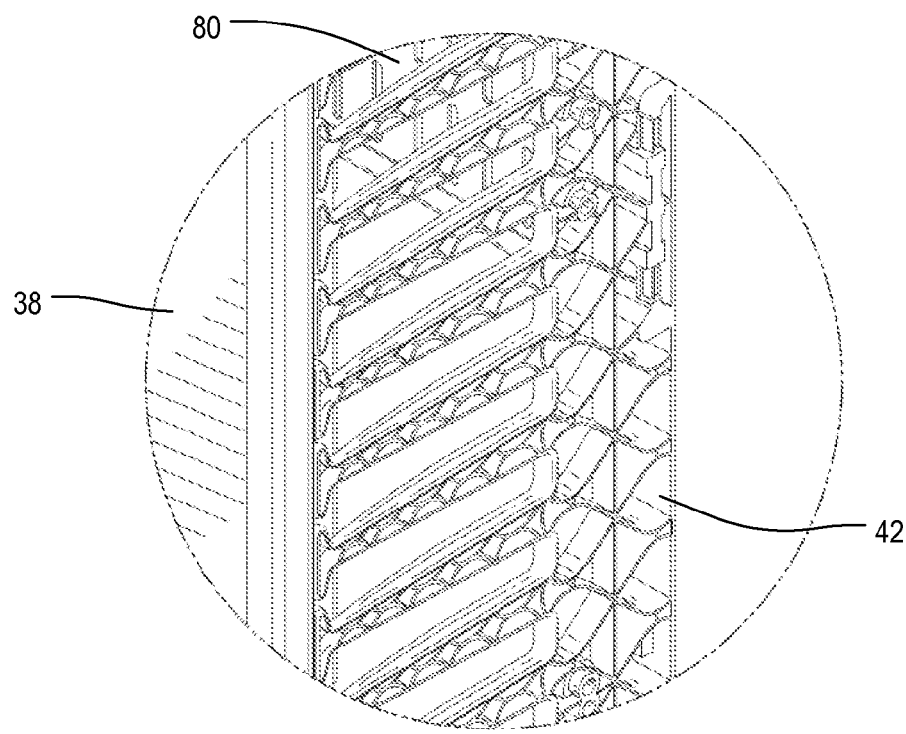
FIGS. 2B and 2C are enlarged views of portions of the vertical cable manager of FIG. 2A.
Figure 2C:
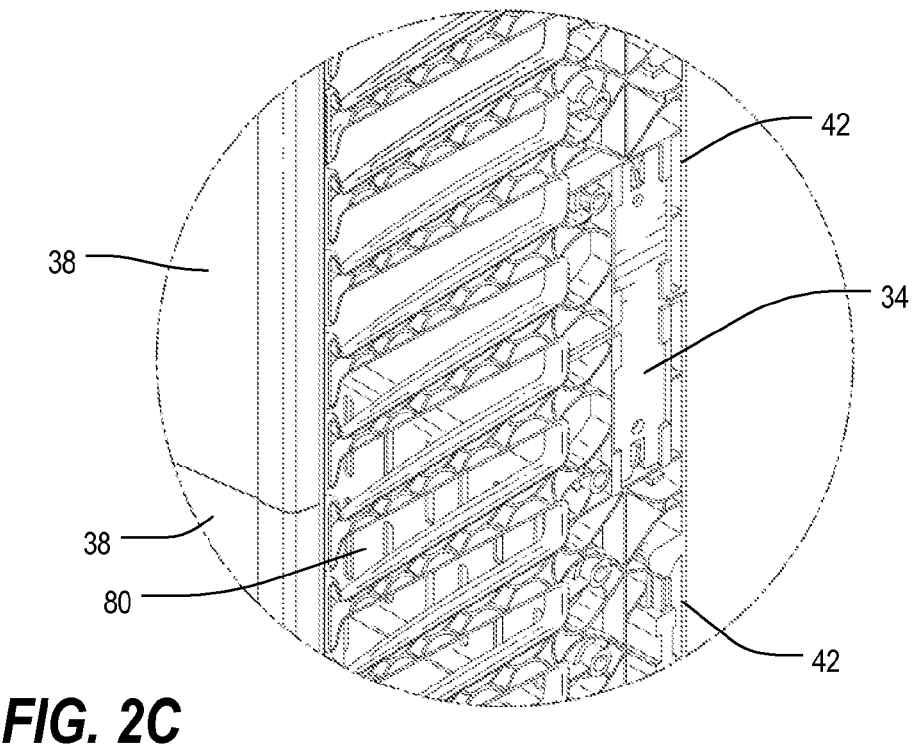
Figure 3:
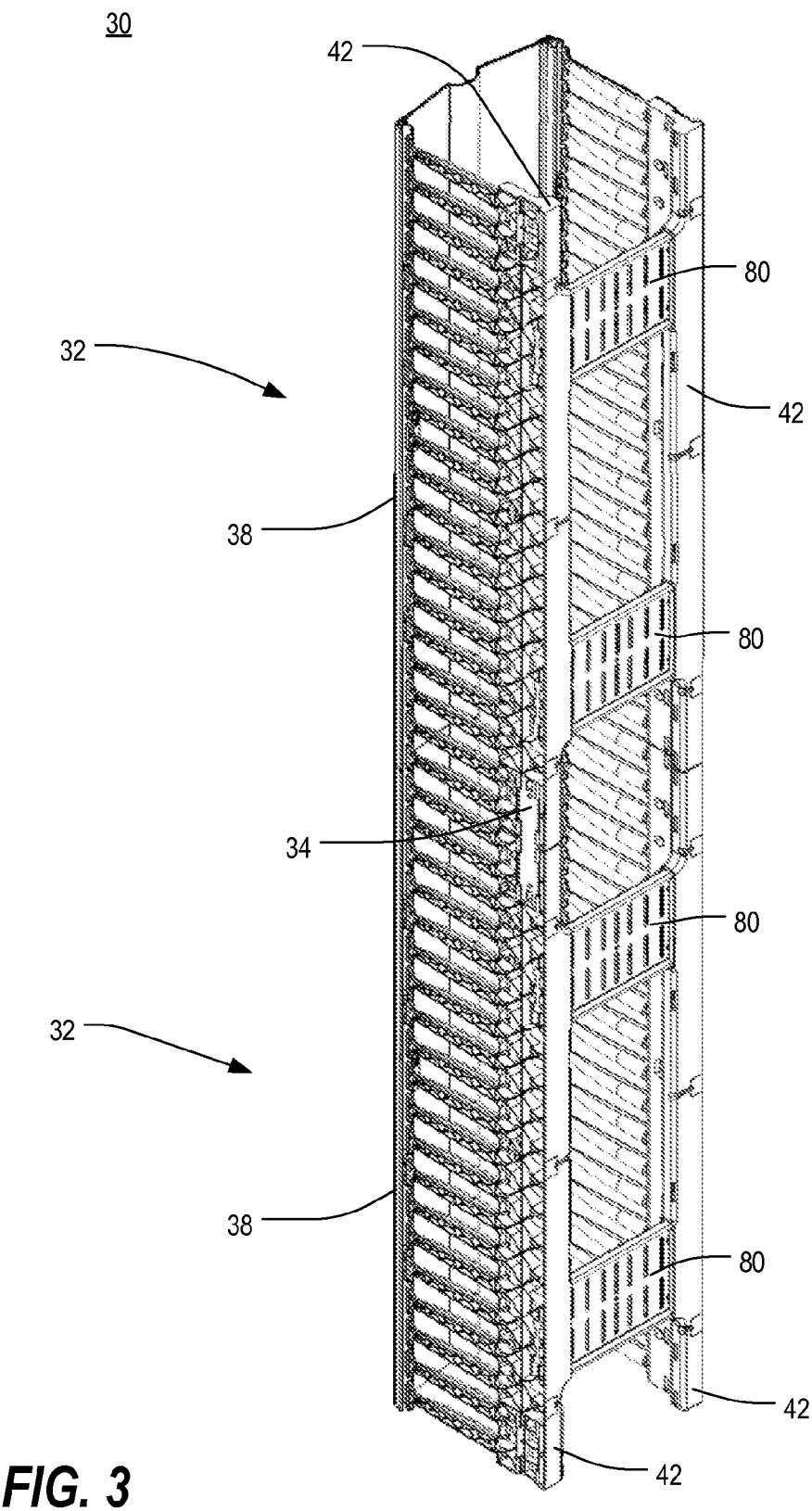
FIG. 3 is a side isometric view of the vertical cable manager of FIG. 1, shown in isolation.

FIGS. 2A and 3 are front and side isometric views of the vertical cable manager 30 of FIG. 1, shown in isolation, and FIGS. 2B and 2C are enlarged views of portions of the vertical cable manager of FIG. 2A. As shown therein, the vertical cable manager 30 includes one or more vertical cable manager units 32, each including a pair of side cable guides 42, one or more midsection members 80, and a door 38. Two or more vertical cable manager units 32 may be interconnected using a pair of splice plates 34. Each of these components will be described in greater detail herein.

Figure 4:
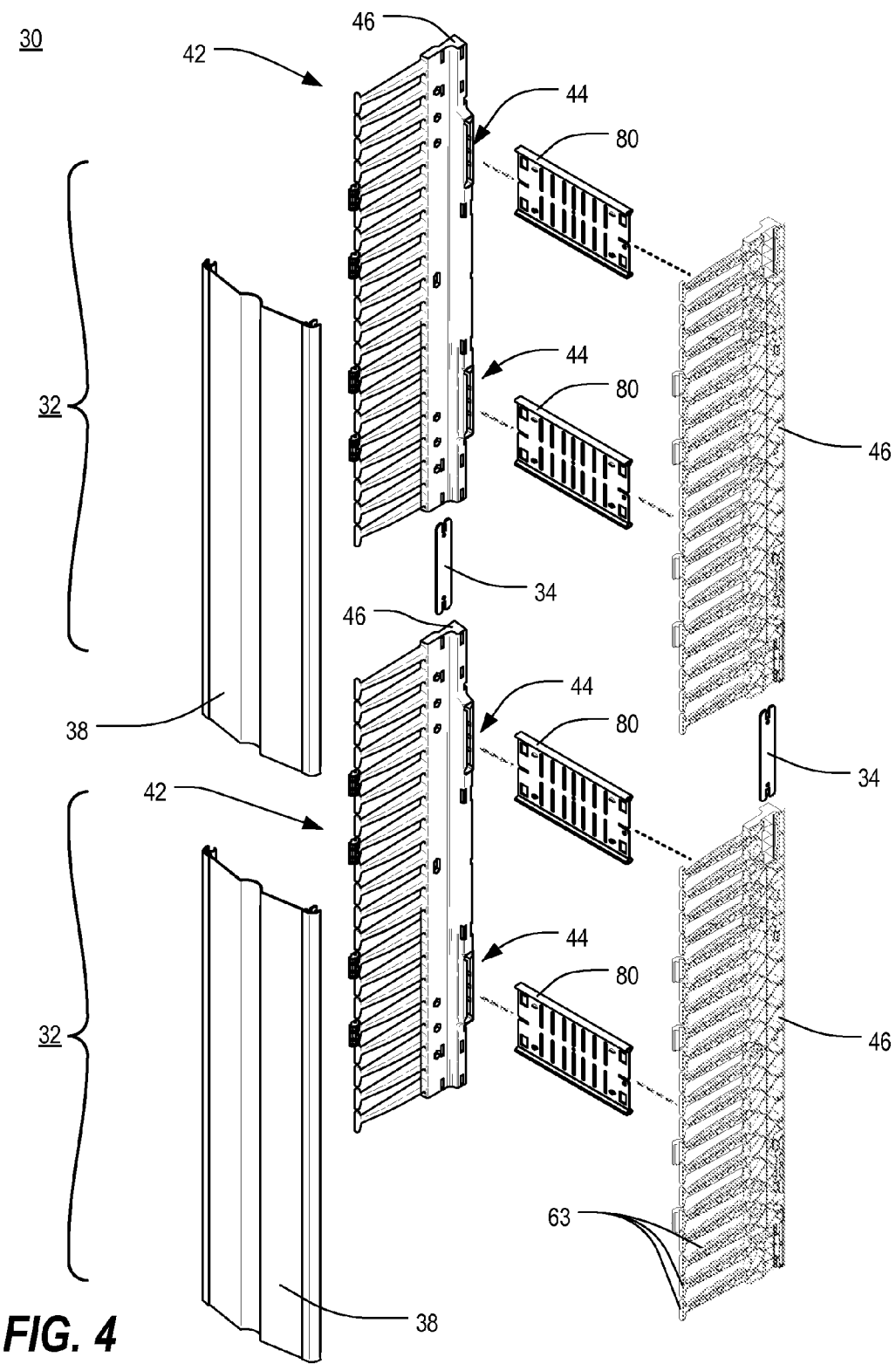
FIG. 4 is a partially exploded isometric view of the vertical cable manager of FIGS. 2A and 3.
Figure 5:
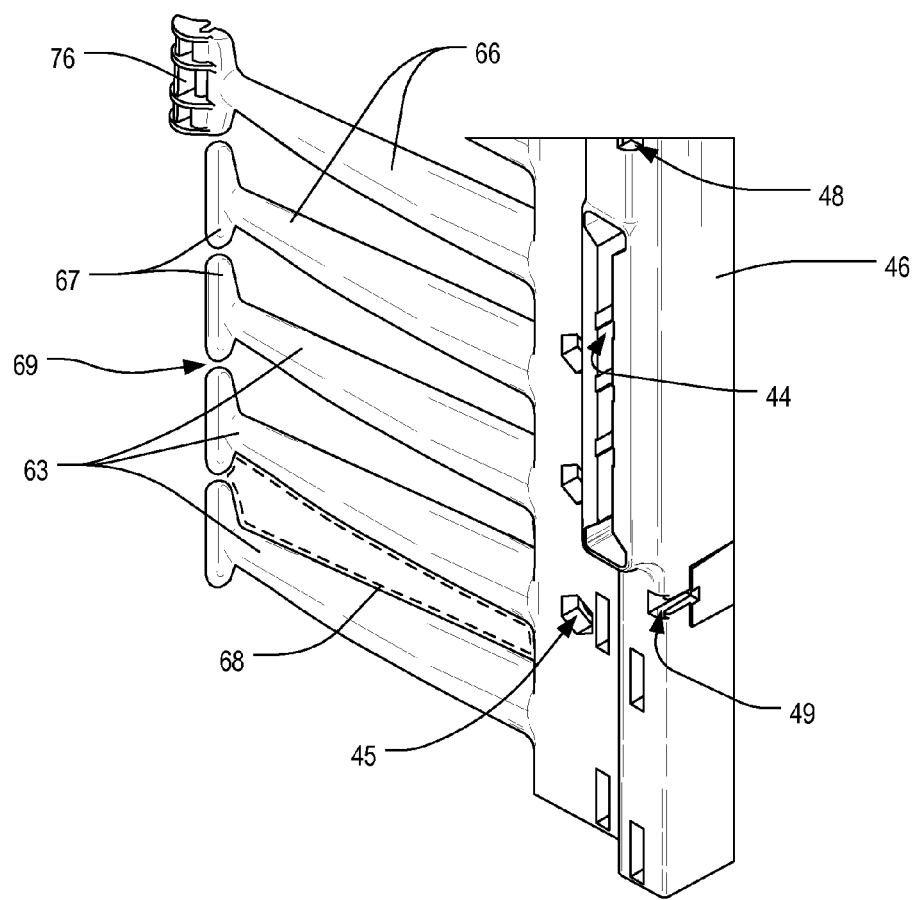
FIG. 5 is an enlarged rear isometric view of a lower portion of one of the side columns of FIG. 4.

FIG. 4 is a partially exploded isometric view of the vertical cable manager 30 of FIGS. 2A and 3, and FIG. 5 is an enlarged rear isometric view of a lower portion of one of the side cable guides 42 of FIG. 4. Each side cable guide 42 has a plurality of T-shaped rib or finger projections 63 extending forwardly from a vertical support column 46. The vertical support column 46 includes at least one, and preferably two or more, midsection member socket 44 for receiving and retaining an end of a midsection member 80 as further described hereinbelow. Other notable features of the side cable guide 42, discussed below, include door attachment hinge bosses 76 disposed at the ends of some of the T-shaped projections 63, mounting bolt holes 45 which align with corresponding holes on the vertical support member 12,14 of the rack 20, cable strapping slots 48 to allow cable bundles to be securely attached inside the cable trough, and rear accessory attachment holes 49.

Each T-shaped projection 63 includes a shaft 66 and a crosspiece 67. Each pair of adjacent T-shaped projections 63 defines a cable ring 68 formed by the respective shafts 66 and crosspieces 67 of the projections 63 and the body of the support column 46. An opening into each cable ring 68 is provided by a gap 69 between the ends of the crosspieces 67 of each pair of adjacent projections 63. This gap 69 permits cables to be inserted into the ring 68 by passing them sideways through the gap 69, as described further in commonly-assigned U.S. Pat. No. 7,119,282 to Krietzman et al., the entirety of which is expressly incorporated herein by reference.

Figure 6:
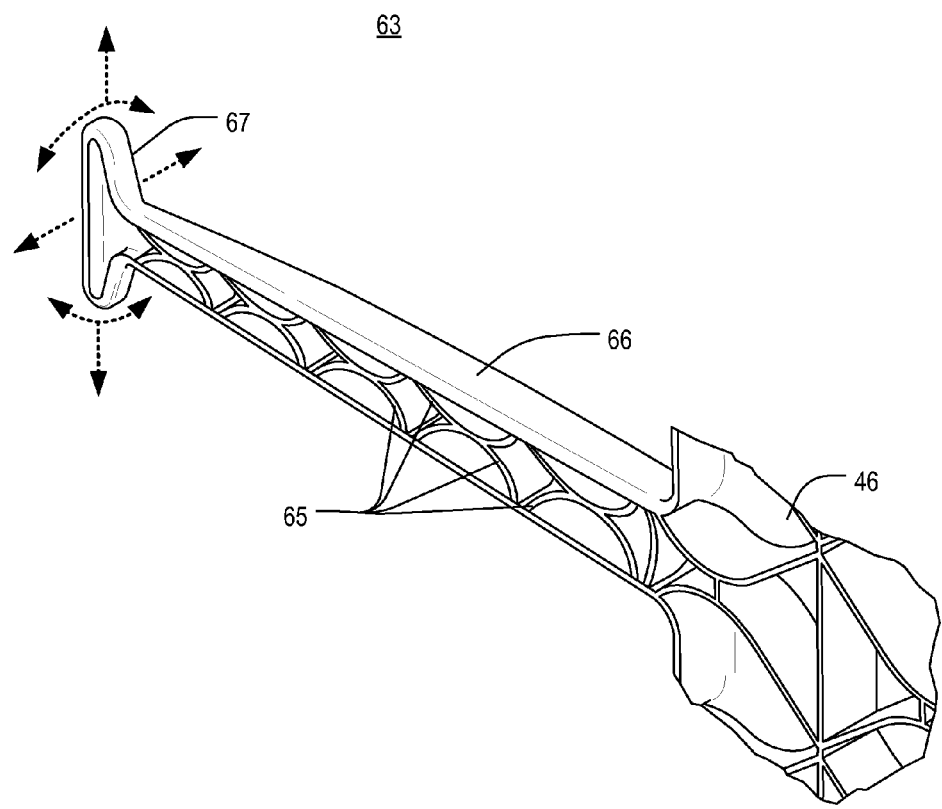
FIG. 6 is a reverse side isometric view of one of the T-shaped projections of FIG. 5.

FIG. 6 is a reverse side isometric view of one of the T-shaped projections 63 of FIG. 5. The shaft 66 of the projection 63 utilizes a reinforced construction characterized by a series of interlocking crescent-shaped reinforcement walls or ribs 65. This geometry is designed to minimize deflection under load in the vertical, horizontal, and twist directions as indicated by the arrows in FIG. 6. The finger cross section is U-shaped which gives the greatest strength in the vertical and horizontal direction. The interior ribs are designed to minimize the twist and also to add strength in the vertical and horizontal direction.

The respective projections 63 are evenly spaced along the length of the vertical support column 46 at a standardized spacing. In the embodiment shown and described, the spacing between the respective projections 63 is equal to a single standard rack mounting unit ("RMU") (conventionally, 1.75 inches), but it should be obvious that other standard spacings could be used such as spacings measured in alternative units or spacings which are multiples of the RMU. By using such a standard spacing, it is ensured that a cable ring 68 is disposed at, and dedicated to, each RMU along the height of a rack 20. Benefits of this arrangement are further described in U.S. Pat. No. 7,119,282.

In at least one embodiment, the T-shaped projections 63 are integrally formed with the vertical support column 46 using an injection molding process. In at least some aspects of the present invention, however, the side cable guides 42 may be constructed according to the teachings of commonly-assigned U.S. patent application Ser. No. 12/350,216 to Garza et al., which published as U.S. Patent Application Publication No. US 2009/0236117 A1, the entirety of which is expressly incorporated by reference herein.

Because each cable guide 42 is formed separately from the midsection members 80 and subsequently attached thereto, rather than being formed integrally therewith, each cable guide 42 may be formed from a different material than the midsection members 80. Thus, although the midsection members 80 may preferably be formed from metal, each cable guide 42 may be injection-molded from plastic in order to create rounded or beveled edges along the edges of the T-shaped projections 63. Various advantages of such an arrangement are described in U.S. Pat. No. 7,119,282.

Figure 7:
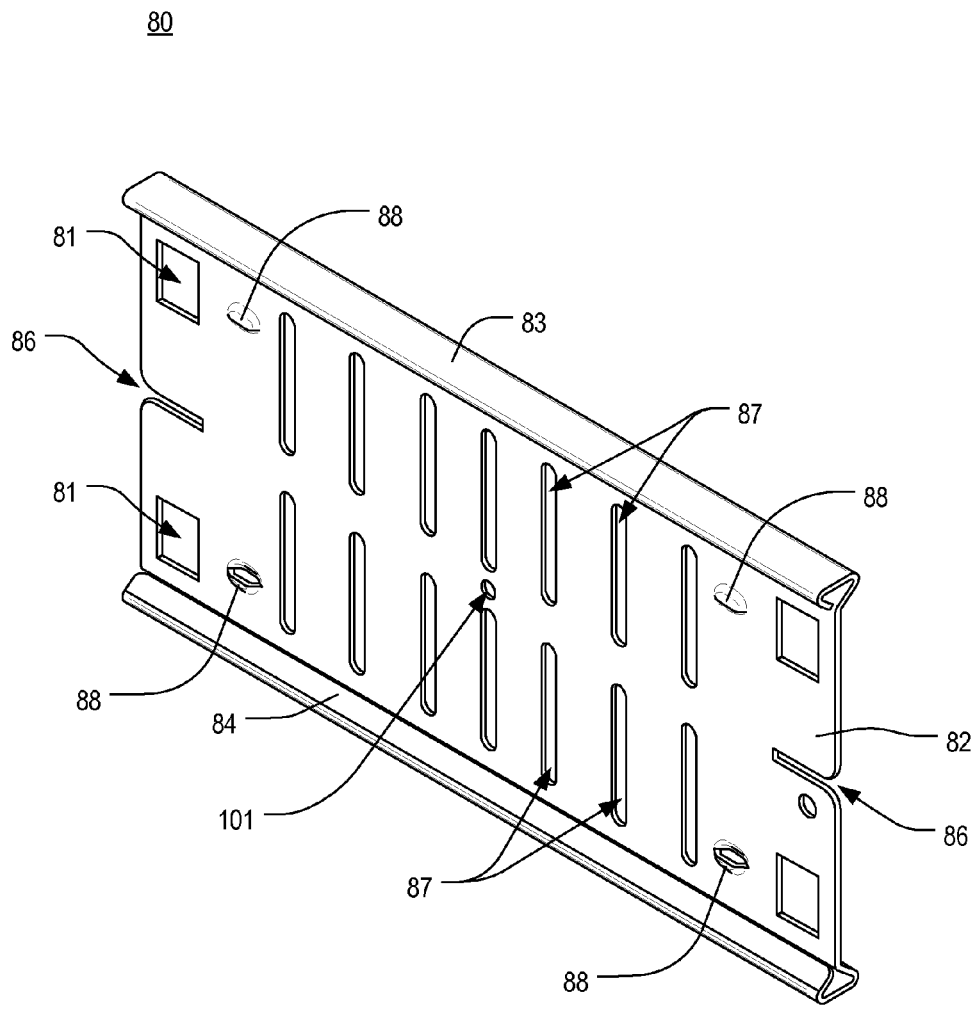
FIG. 7 is an isometric view of one of the midsection members of FIG. 4.

Interconnection between the side cable guides 42 is provided by the midsection members 80. FIG. 7 is an isometric view of one of the midsection members 80 of FIG. 4. In the embodiment illustrated in FIG. 4, two midsection members 80 are utilized in each vertical cable manager unit 32 and they are disposed near the ends thereof. However, it will be apparent to the Ordinary Artisan that, in at least some embodiments, greater numbers of midsection members 80 may be used, that they may be spaced evenly or irregularly, and that optional mounting locations may be available, provided, of course, that appropriate mounting means and locations are provided on the support columns 46.

Figure 8:
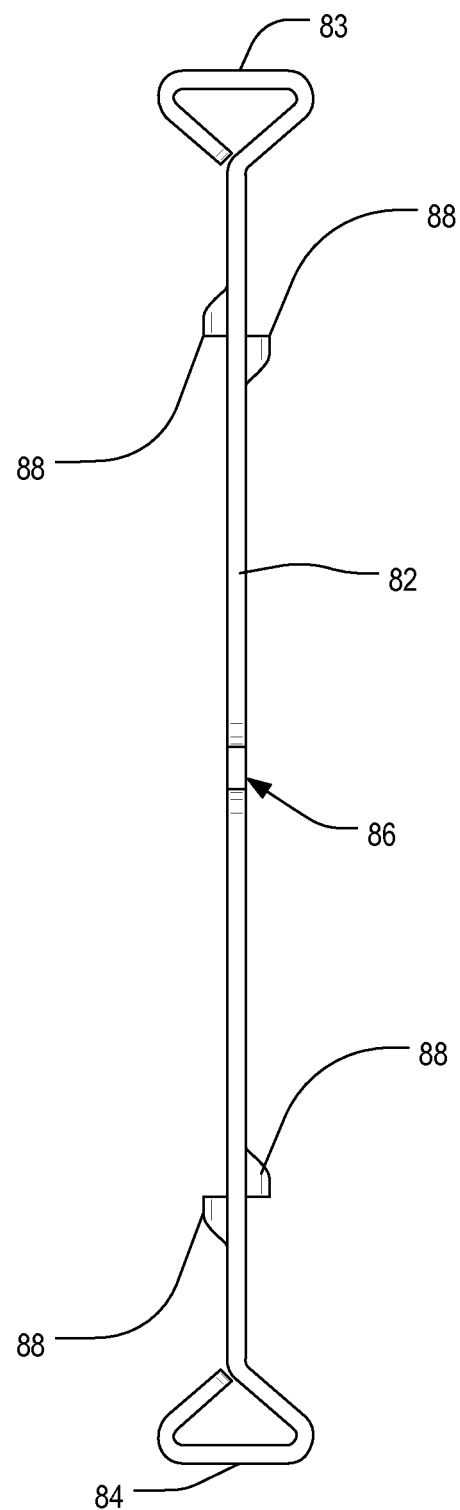
FIG. 8 is an end view of the midsection member of FIG. 7.

FIG. 8 is an end view of the midsection member 80 of FIG. 7. As illustrated in FIGS. 7 and 8, each midsection member 80 includes a web 82 and two flanges 83,84, thereby forming a structure that is generally I-shaped in cross-section. The web 82 is preferably penetrated by a plurality of mounting openings that may include pairs of slots 87, individual apertures 101, groupings of apertures (not shown), or the like. In the illustrated embodiment, multiple pairs of slots 87 are arranged vertically along the length of the web 82, and a single aperture 101 is included near the center of the web 82. However, it will be apparent to the Ordinary Artisan that other arrangements may be provided, such as any of those disclosed in U.S. Patent Application Publication No. US 2009/0236117 A1.

Each midsection member 80 further includes a number of elements to facilitate connection of the member 80 to a pair of the side cable guides 42, including one or more cable guide locking holes 81 near each end of the web 82, an alignment slot 86 extending inward from each end of the web 82, and one or more cable guide alignment bosses 88 disposed near each end of the web 82. As described below, the alignment slots 86 at the ends position the midsection member 80 within the socket 44 in the cable guide 42 in the vertical direction by fitting over a corresponding shelf (not illustrated) provided in the back of the socket 44 for that purpose. The alignment bosses 88 position the midsection member 80 laterally within the socket 44. The cable guide locking holes 81 engage with cable guide locking tabs 47, described below, to retain the midsection member 80 in the socket 44. The accessory attachment features (slots and hole) are for mounting optional accessories such as cable spools and cable lashing bars.

In an alternative not illustrated herein, midsection members comprising two telescoping sections may be substituted for the fixed-length midsection members 80 illustrated herein.

The midsection members 80 may be formed sheet metal; however, other manufacturing methods could be used such as an extrusion. The flanges 83,84 preferably have a formed closed profile that gives the member 80 stiffness and also provides a smooth radius edge that prevents damage to cables that pass over the member 80, as perhaps best understood with reference to FIG. 8.

Figure 9:
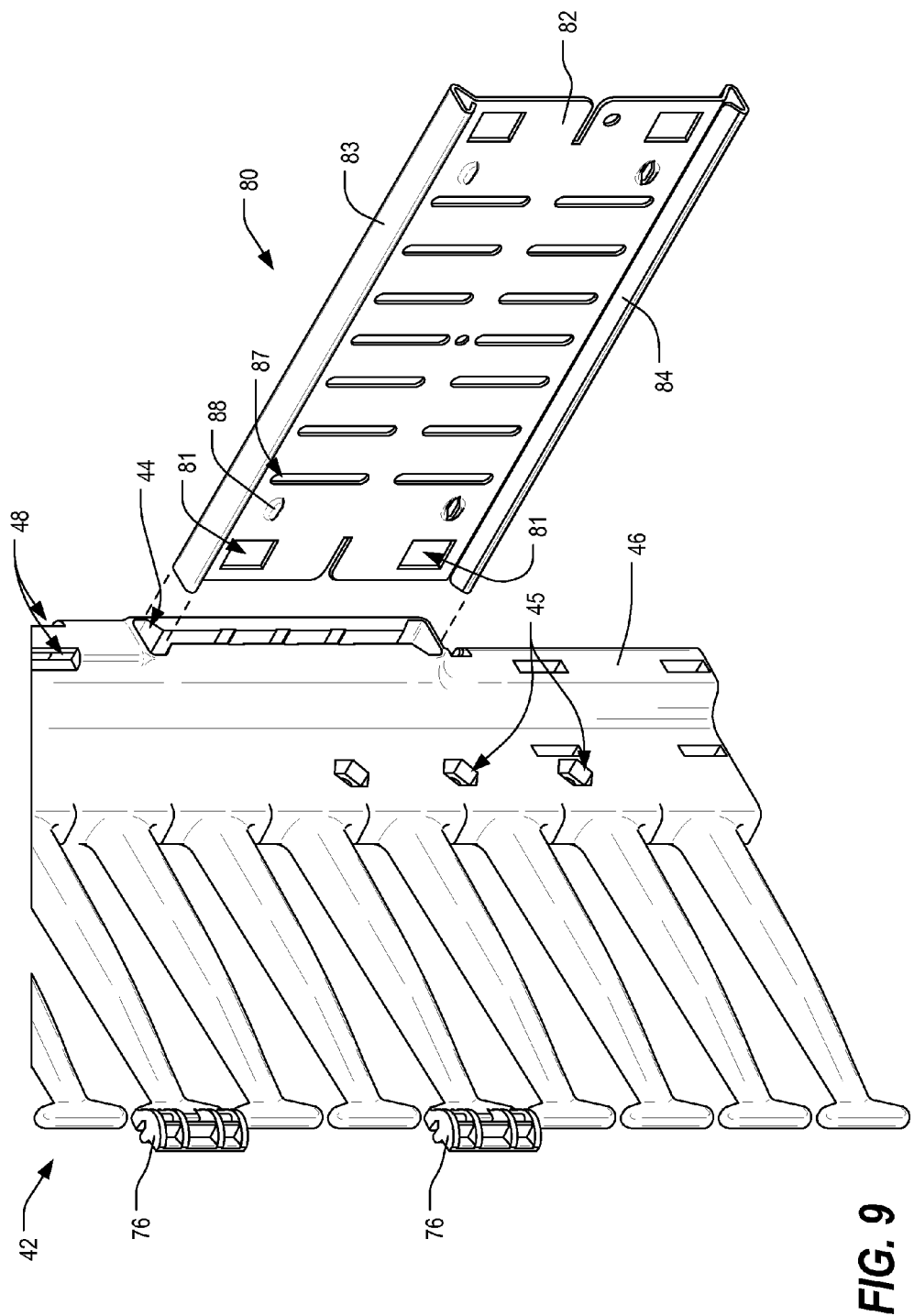
FIGS. 9 and 10 are isometric views of the midsection member of FIG. 7 being connected to the lower end of the side cable guide of FIG. 5.
Figure 10:
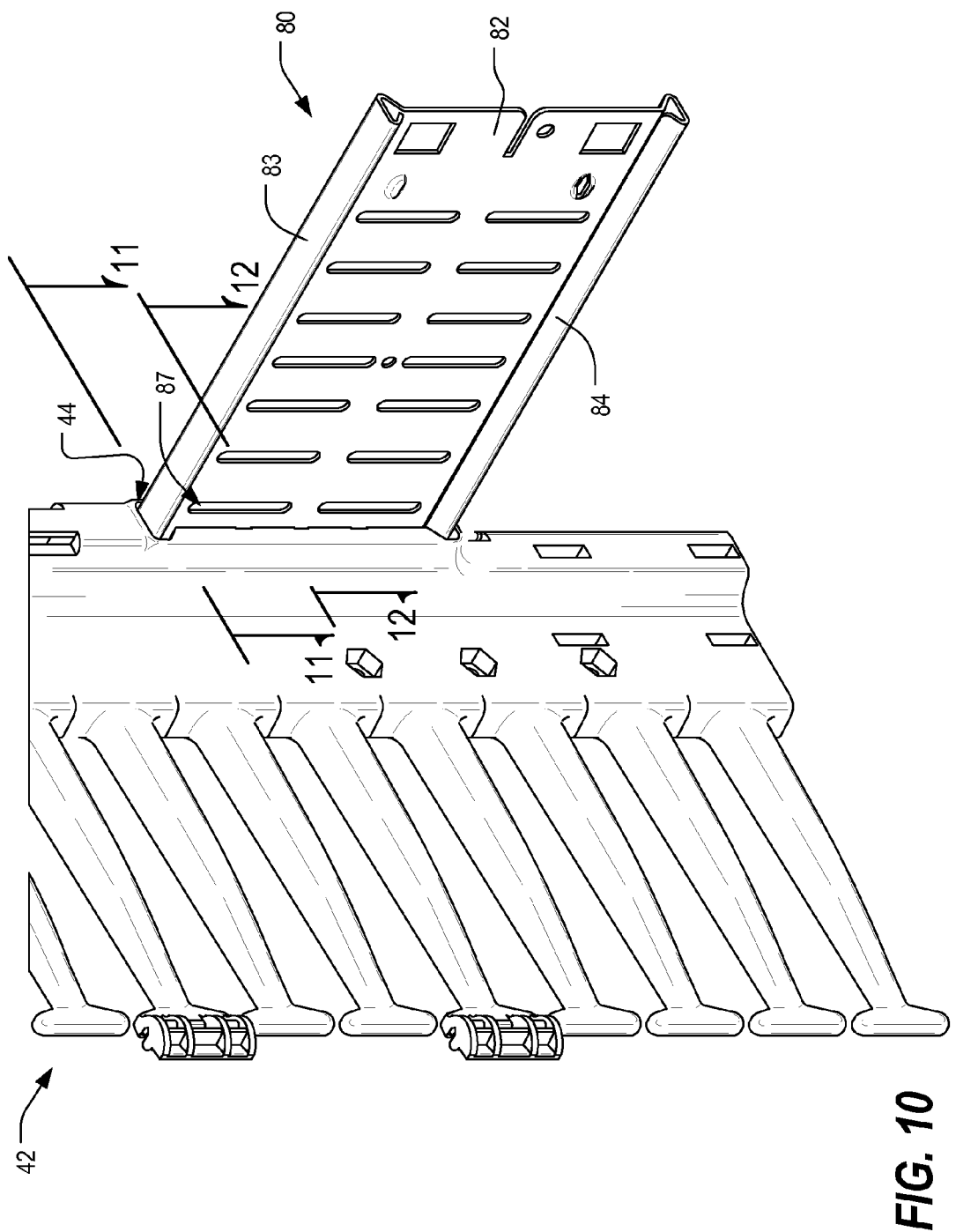
Figure 11:
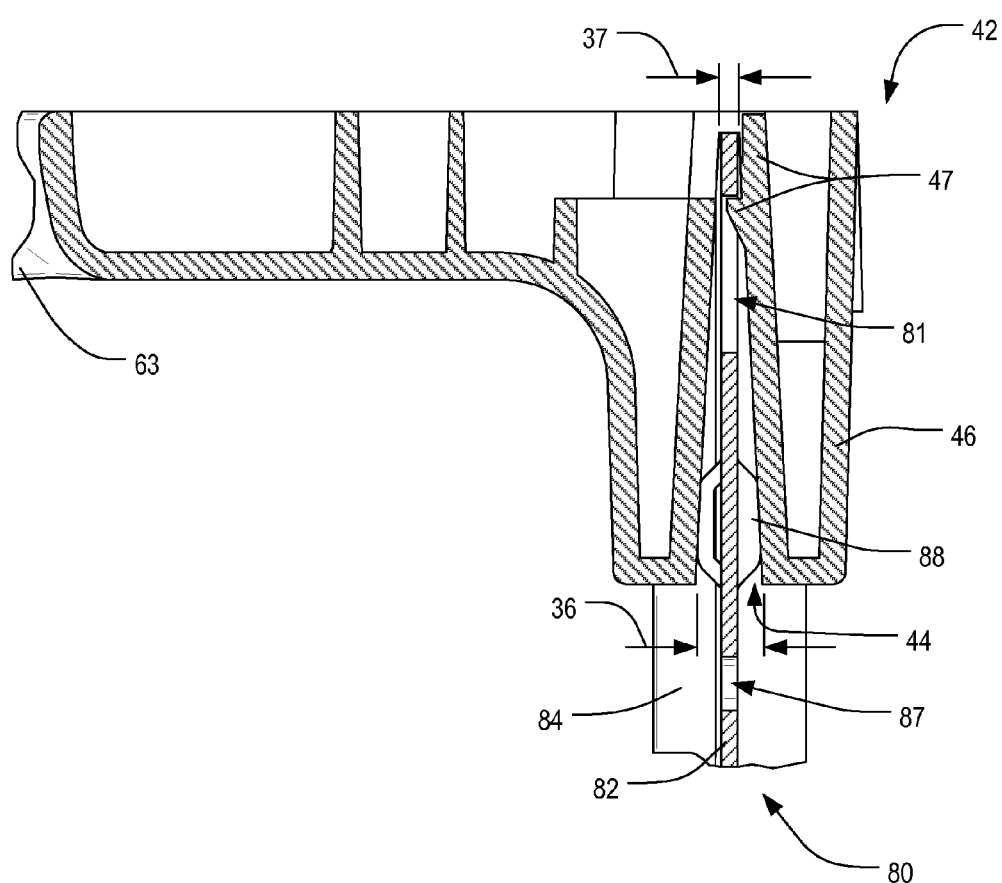
FIG. 11 is a cross-sectional view of the assembly of FIG. 10, taken along line 11-11.
Figure 12:
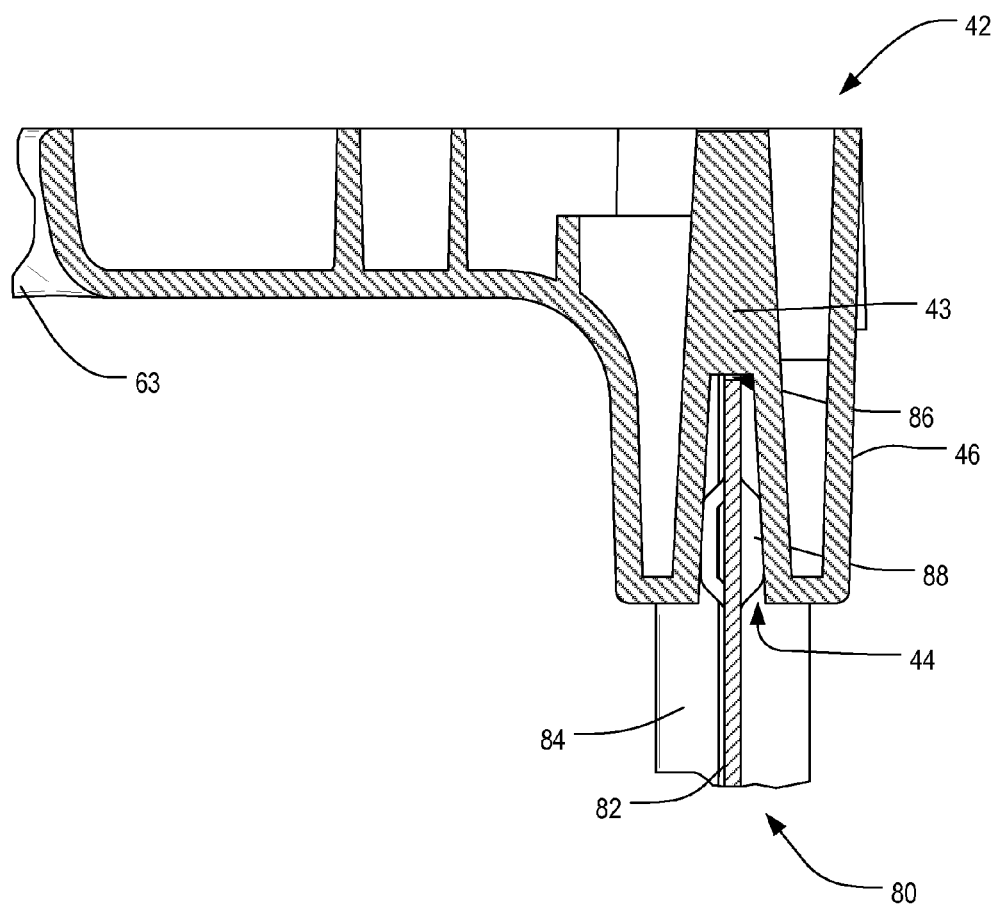
FIG. 12 is a cross-sectional view of the assembly of FIG. 10, taken along line 12-12.

FIGS. 9 and 10 are isometric views of the midsection member 80 of FIG. 7 being connected to the lower end of the side cable guide 42 of FIG. 5. As evident therefrom, the end of the midsection member 80 is received within the socket 44, whose cross-sectional shape corresponds to that of the midsection member 80. FIGS. 11 and 12 are cross-sectional views of the assembly of FIG. 10, taken along lines 11-11 and 12-12 respectively. As shown in FIG. 11, the socket 44 has a large taper such that the width 36 of the slot 44 at the entrance is much wider than that of the midsection member 80, making it easy to insert the member 80, while the base of the socket 44 is much narrower and is only slightly wider than the thickness of the midsection member 80. This geometry tends to hold the end of the midsection member 80 securely within the socket 44.

As illustrated in FIG. 12, when the midsection member 80 is seated within the socket 44, a shelf 43 located in the back of the socket 44 is inserted into the alignment slot 86, thus enabling the midsection member 80 to be positioned vertically within the socket 44 with relative precision. The alignment bosses 88 of the midsection member bear on interior walls of the socket 44, thereby enabling the midsection member 80 to be positioned laterally within the socket 44 with relative precision. In order to retain the midsection member 80 in this disposition, a pair of locking tabs 47 are provided within the socket 44 so as to interface with the locking holes 81 in the midsection member 80. When enough force is exerted on the midsection member 80 relative to the side cable guide 42, the end of the web 82 thereof is forced past the locking tabs 47, which are beveled for this purpose, and the locking tabs 47 then snap into the locking holes 81, as shown in FIG. 11.

Figure 13:
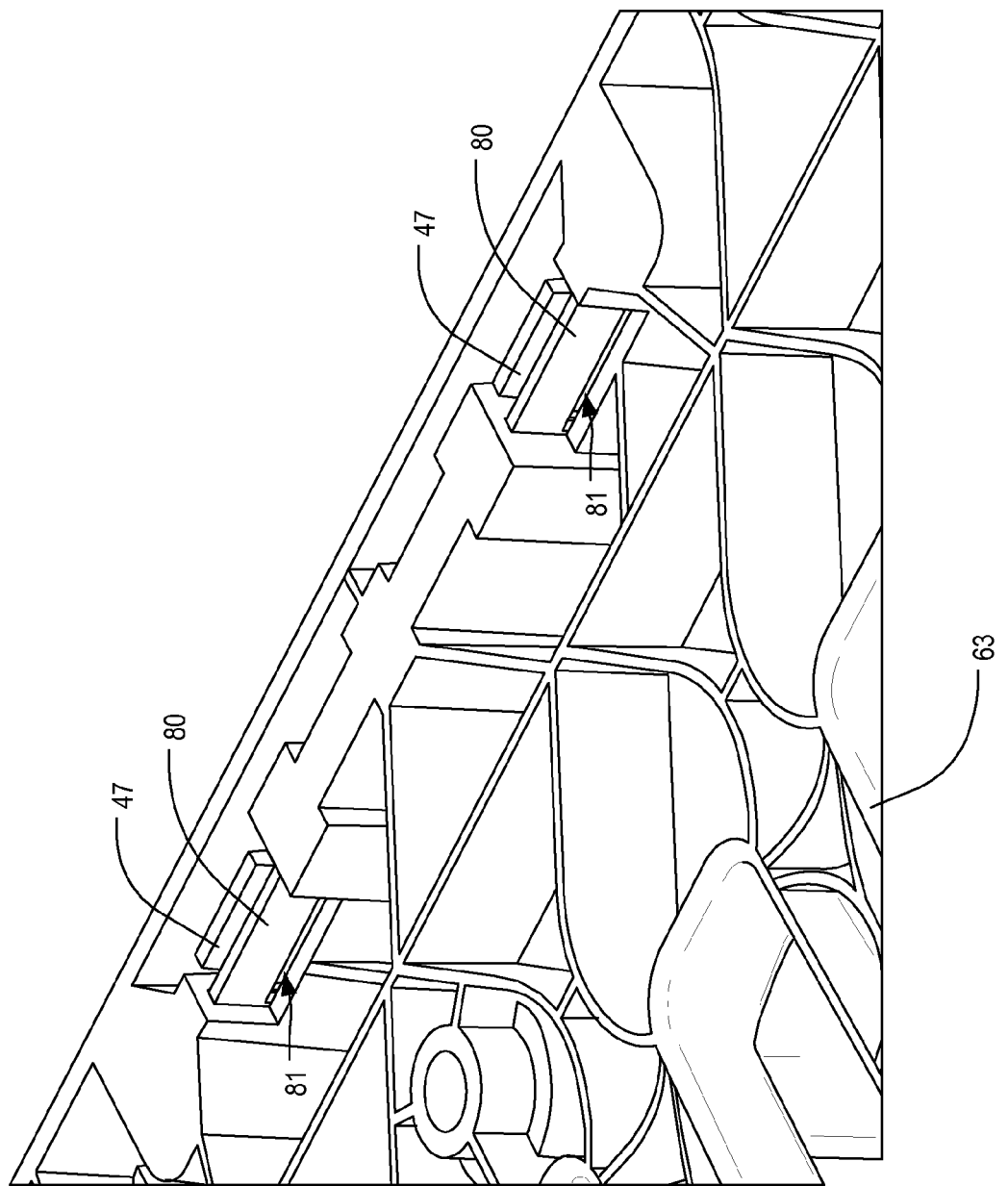
FIG. 13 is a fragmentary rear isometric view of a portion of the side cable guide and midsection member of FIGS. 11 and 12.

FIG. 13 is a fragmentary rear isometric view of a portion of the side cable guide 42 and midsection member 80 of FIGS. 11 and 12. As illustrated therein, a portion of each locking tab 47 extends through the body of the cable guide 42 and protrudes therefrom, where it may be accessed by a user. By depressing the tabs 47, the catch portions thereof are withdrawn from the locking holes 81 in the midsection member 80. In this state, the midsection member 80 may be removed from the socket 44.

With reference to FIG. 4, it will be appreciated that a single vertical cable manager unit 32 may be assembled by connecting two side cable guides 42 together using two midsection members 80 in the manner described.

Figure 16:
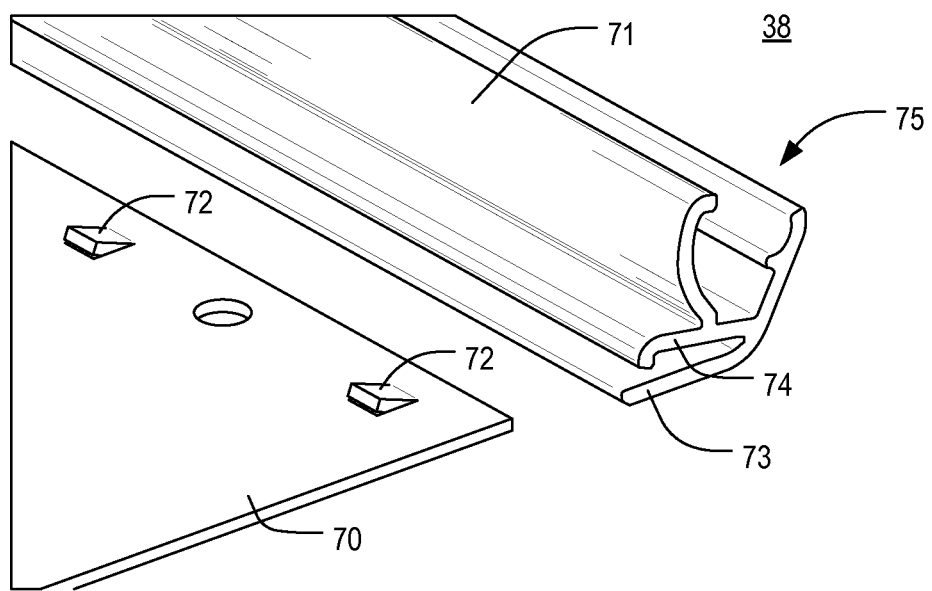
FIG. 16 is an isometric view of an end of one of the doors of FIG. 4, shown in a partially disassembled state.

FIGS. 15 and 16 are a profile view and an isometric view of an end of one of the doors 38 of FIG. 4, shown in a partially disassembled state. As shown therein, each door 38 includes a center panel 70 and two edge pieces 71. The panel 70 may be of any shape but includes series of outwardly-extending tabs 72 along the edges thereof. Viewed in profile, each edge piece 71 includes a hinge structure 75, described in greater detail hereinbelow, as well as two fingers 73,74 that define a channel into which fits a respective edge of the panel 70. One finger 74 is hooked to fit over and engage the tabs 72 along the edge of the panel 70. Thus, each edge piece 71 may be attached to the panel 70 by inserting the panel edge into the channel defined by the fingers 73,74 of the edge piece and snapping the hooked finger 74 over the tabs 72. The composite construction of the door 38 permits the edge pieces 71 and panels 70 to be manufactured separately and from different materials. In at least one embodiment, the edge pieces 71 are extruded plastic while the panel 70 is constructed of sheet metal. The composite construction also permits panels 70 of different widths to be used with the same edge pieces 71 to form doors 38 of different widths.

FIG. 14 is a profile view of an end of an alternative door 138 for use in one or more preferred embodiments of the present invention. In particular, the door 138 of FIG. 14 is a single piece, such as a single piece plastic extrusion. Such a construction, which utilizes a hinge structure 75 similar to that of the edge pieces 71 of the door 38 of FIGS. 15 and 16, may generally be substituted for the composite door 38, but may be particularly suitable for cable managers of narrow widths.

Figures 17, 18:
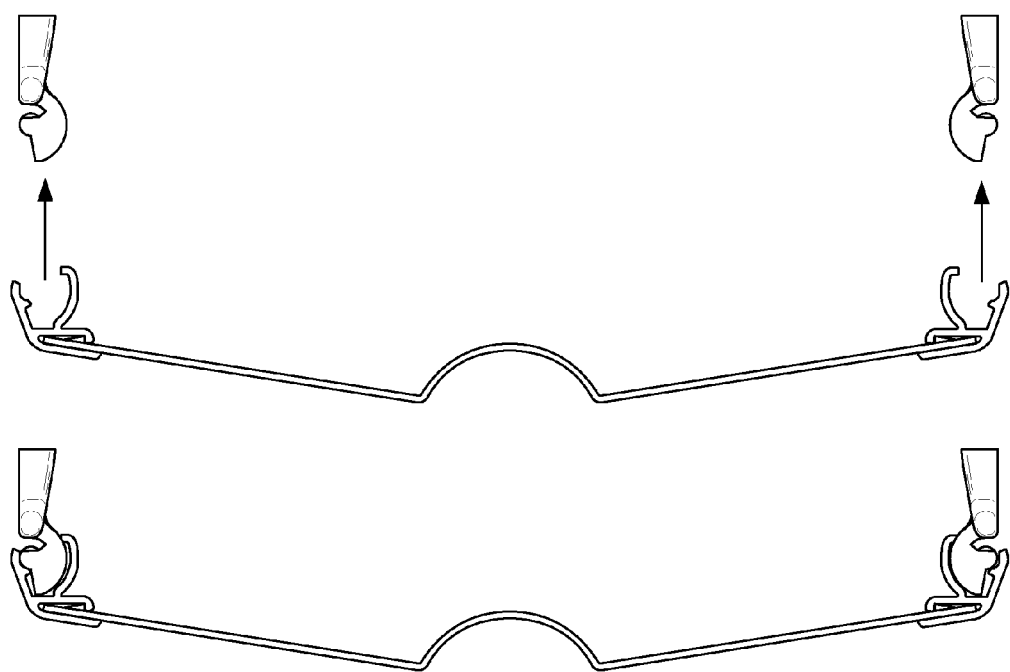
FIGS. 17 and 18 are schematic top views of one of the doors and two of the side cable guides of FIG. 4.
Figure 19:
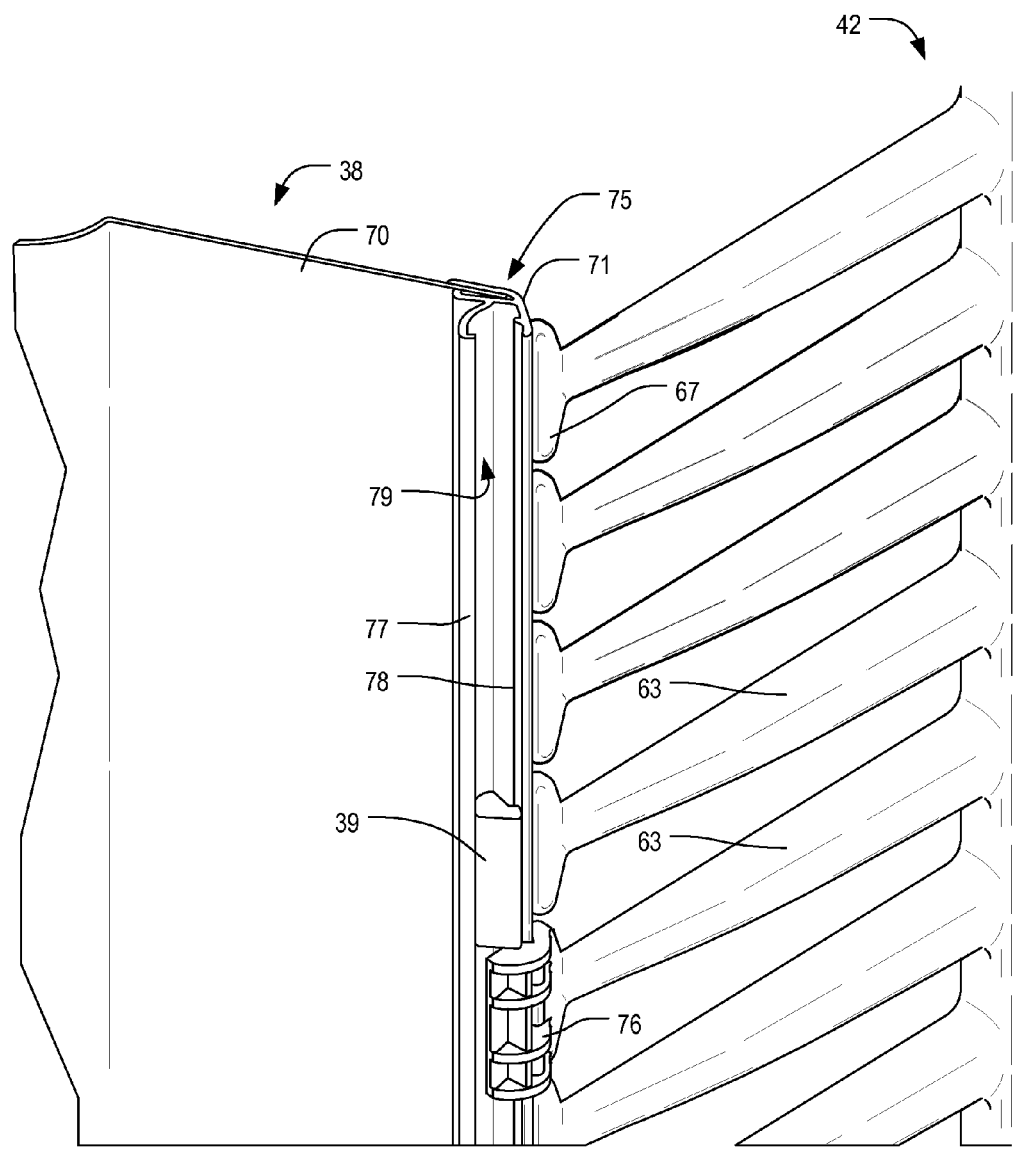
FIG. 19 is a fragmentary isometric view of an upper portion of one of the doors and one of the side cable guides of FIG. 4.

Regardless of construction, the door 38,138 is mounted on the side cable guides 42 by snapping the hinge structure 75 onto the hinge bosses 76 located on the ends of some of the T-shaped projection 63. This is illustrated in FIGS. 17 and 18, which are schematic top views of one of the doors 38 and two of the side cable guides 42 of FIG. 4, and FIG. 19, which is a fragmentary isometric view of an upper portion of one of the doors 38 and one of the side cable guides 42 of FIG. 4. As shown therein, the hinge structure 75 includes two arms 77,78, defining a hinge channel 79, that may be snapped around the hinge bosses 76. Although the friction inherent in these couplings tends to support the door 38 at the proper height without need for vertical support, slippage may be further prevented using stops 39, an example of which is shown in FIG. 19, inserted into the hinge channel 79 so as to bear on the tops of the hinge bosses 76 when the door 38 is installed at the proper height. The stops 39 may be of molded or extruded plastic and may be glued or otherwise affixed in place.

Figures 20, 21:
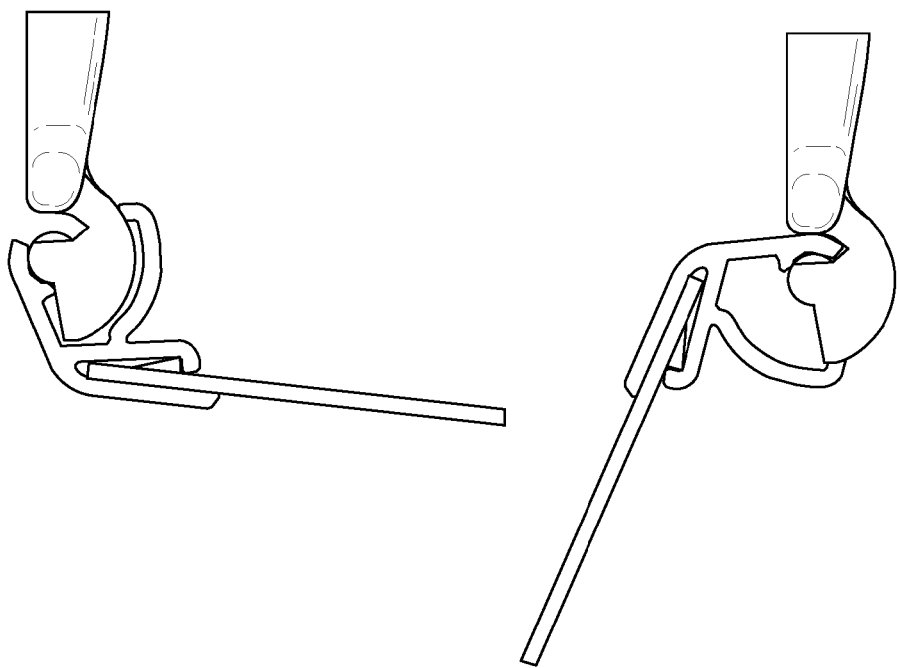
FIGS. 20 and 21, which are schematic top views of the door and one of the side cable guides of FIGS. 17 and 18.

With reference to FIG. 19, the outer arm 77 of the hinge structure 75 is adapted to rotate around one side of the hinge boss 76 and includes a hook at its distal end that serves as a door retaining stop, while the inner arm 78 includes a structure having a semi-cylindrical inner surface adapted to rotate around another side of the hinge boss 76. The door 38 is mounted on the side cable guides 41,42 by snapping the hinge structure 75 onto the hinge bosses 76. Once installed, the door 38 may be opened along either side by unsnapping the hinge structure 75 of the respective edge piece 71 from the hinge bosses 76 and rotating the door about the hinge bosses 76 on the opposite side of the door 38. This rotation is illustrated in FIGS. 20 and 21, which are schematic top views of the door 38 and one of the side cable guides 42 of FIGS. 17 and 18. As shown therein, portions of the hinge arms 77,79 rotate around semi-cylindrical surfaces of the hinge boss. As the door 38 is rotated to the position shown in FIG. 21, it will be appreciated that the door retaining stop at the end of the outer hinge arm 77 reaches a cam located at the distal end of the hinge boss 76. When it does so, it snaps into place, thereby holding the door 38 in place in that position. The force required to rotate the door 38 out of that position is intended to be relatively minimal such that a user may manipulate the door 38 easily to remain open or to be closed, as desired.

Figure 22:
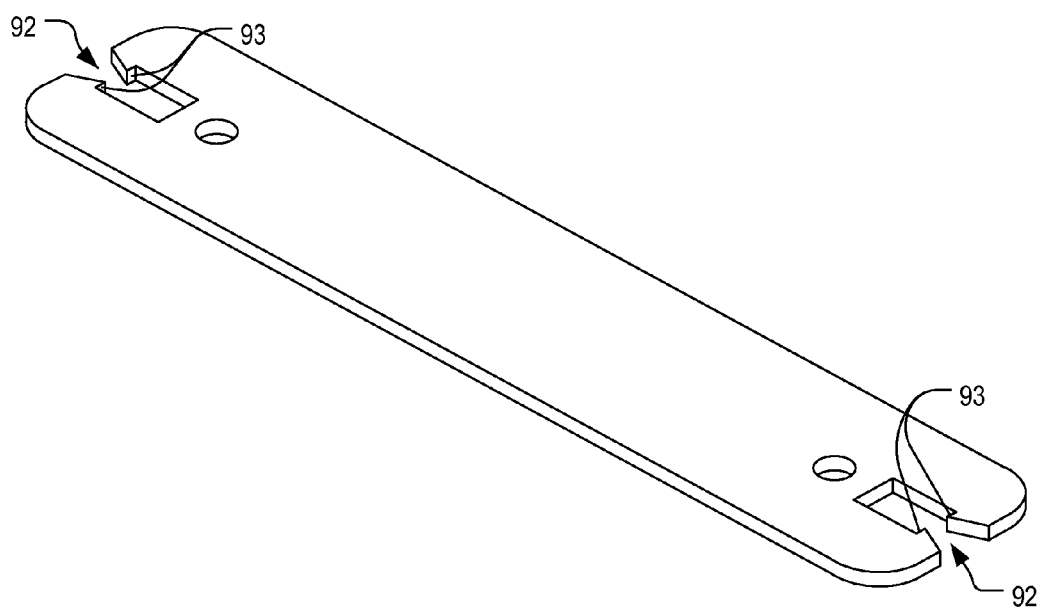
FIG. 22 is an isometric view of one of the splice plates of FIG. 4.

As shown in FIGS. 2A, 3 and 4, two or more vertical cable manager units 32 may be stacked on top of each other to create a modular vertical cable manager 30 of greater length. This may accomplished using splice plates 34 to connect side cable guides 42 together. FIG. 22 is an isometric view of one of the splice plates 34 of FIG. 4. As shown therein, the splice plate 34 is a flat, elongated structure having a notch 92 at each end. Each notch 92 includes at least one and preferably two locking catches 93 arranged therein.

Figure 23:
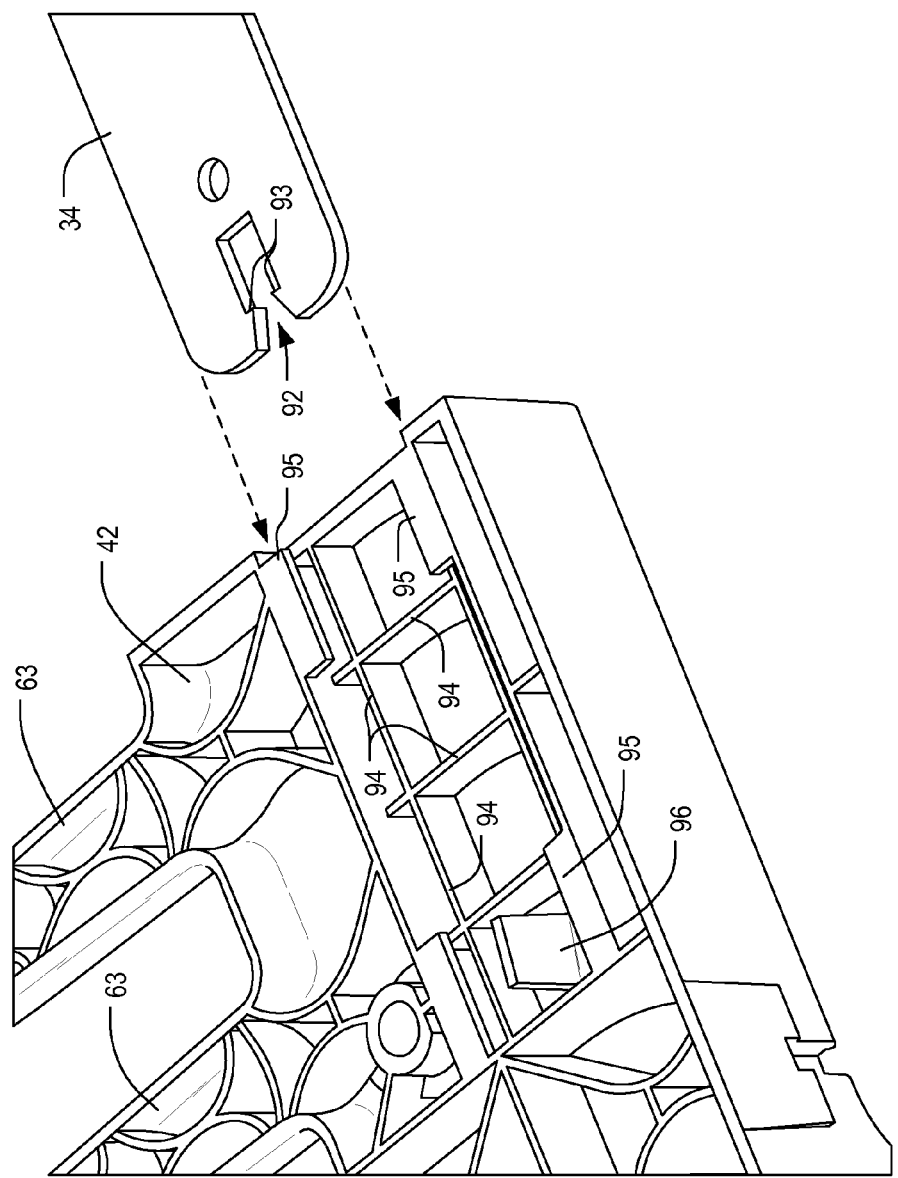
FIGS. 23 and 24 are fragmentary side isometric views of the splice plate of FIG. 22 and one of the side cable guides of FIG. 4.
Figure 24:
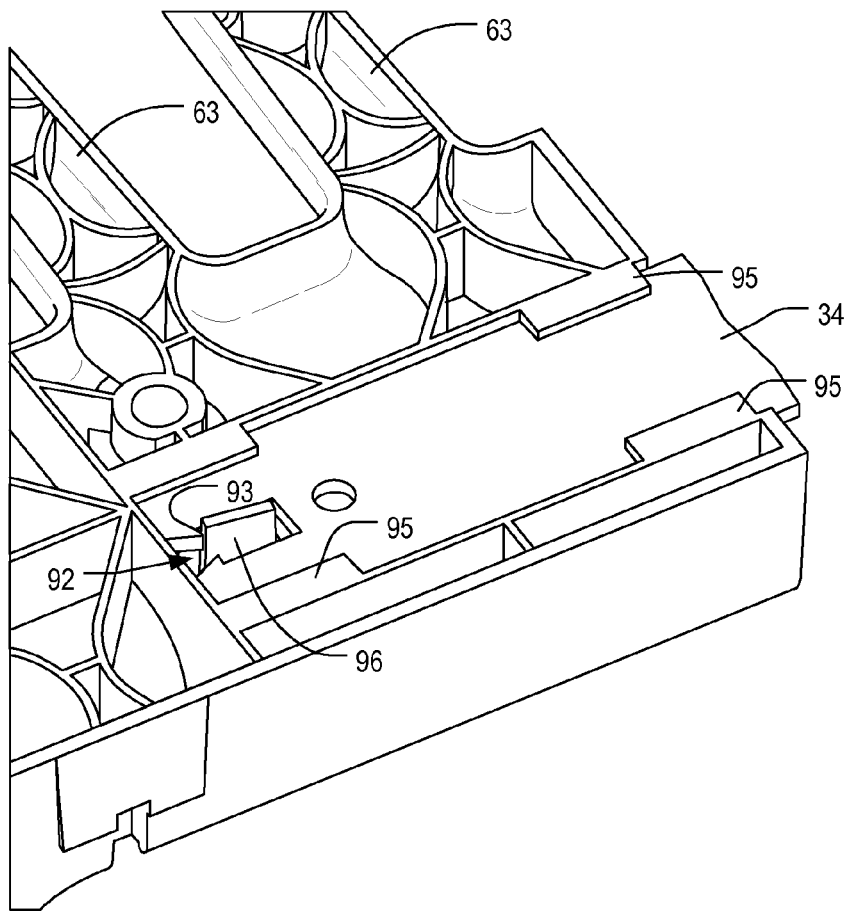
Figure 25:
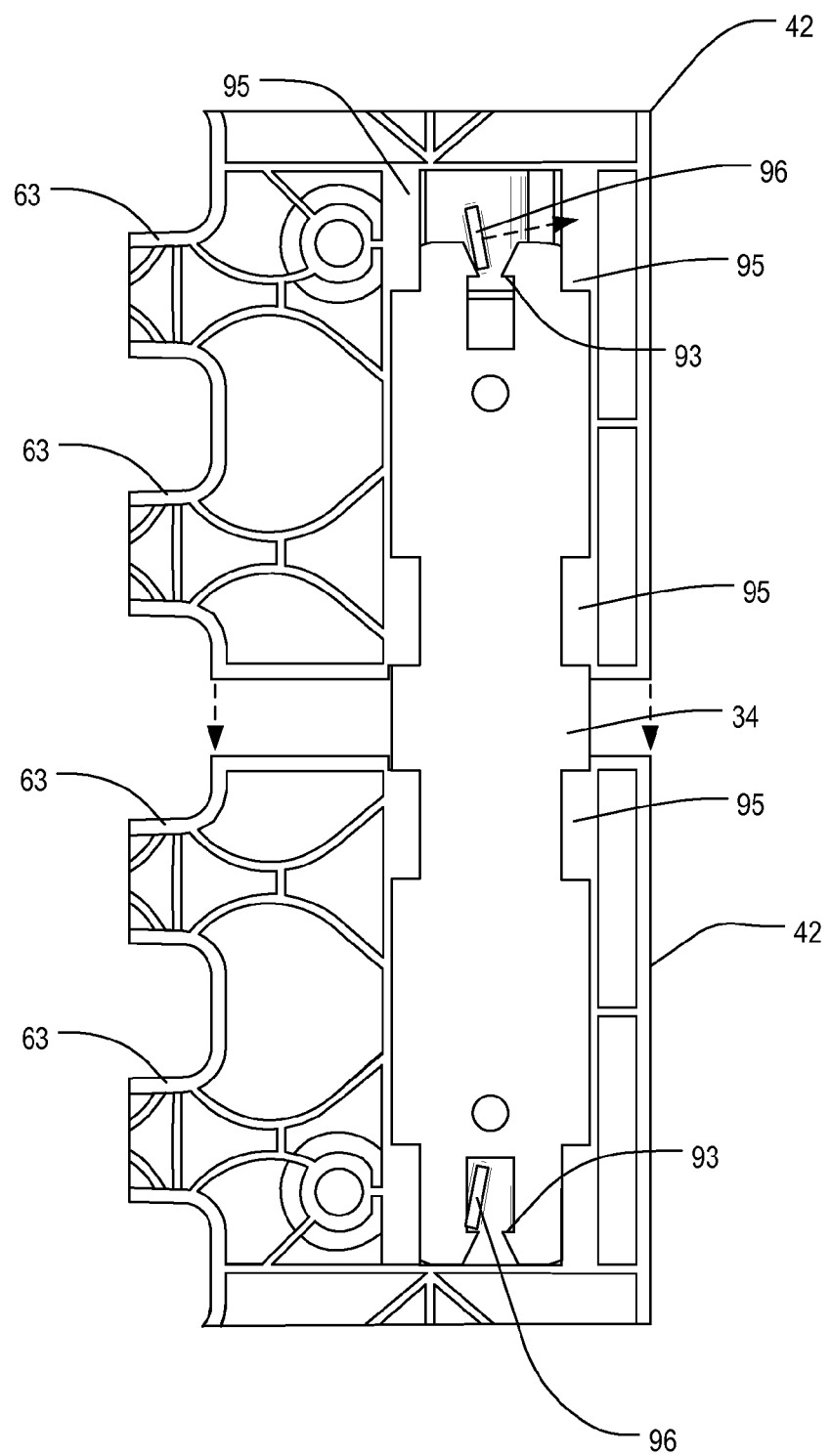
FIG. 25 is a side plan view of the splice plate of FIG. 22 and two of the side cable guides of FIG. 4.

FIGS. 23 and 24 are fragmentary side isometric views of the splice plate 34 of FIG. 22 and one of the side cable guides 42 of FIG. 4. As perhaps best seen in FIG. 23, the side cable guide 42 includes a plurality of ribs 94, forming a bed for receiving the splice plate 34, and a plurality of tabs 95 cover the bed for retaining the splice plate 34 on the bed, thereby forming a receptacle for receiving an end of the splice plate 34. An upright lock tab 96 is disposed at the inner end of the bed. To connect the splice plate 34 to the cable guide 42, the splice plate 34 may be inserted beneath the tabs 95 and onto the ribs 94 of the bed. When the slot 92 in the end of the splice plate 34 encounters the lock tab 96, a beveled portion of one of the locking catches 93 forces the lock tab 96 to bend aside until the splice plate 34 is fully seated in the cable guide 42, at which point the lock tab 96 snaps into place behind the locking catch 93 as shown in FIG. 24, thereby locking the splice plate 34 in place. The opposite end of the splice plate 34 may be connected to the end of a second side cable guide 42 in the same manner. FIG. 25 is a side plan view of the splice plate 34 of FIG. 22 and two of the side cable guides 42 of FIG. 4, wherein the lock tab 96 of the second side cable guide 42 is being forced aside by the locking catch 93. This construction facilitates the assembly of a cable manager 30 without the use of any tools.

The splice plate 34 may be removed from either of the cable guides 42 by depressing the respective lock tab 96, thereby removing it as an obstacle to removal of the locking catch 93, and pulling the splice plate 34 out of the cable guide 42. The lock tabs 96 protrude slightly from their surroundings to facilitate this purpose. Disassembly is thus likewise achievable without the use of any tools.

Figure 26:
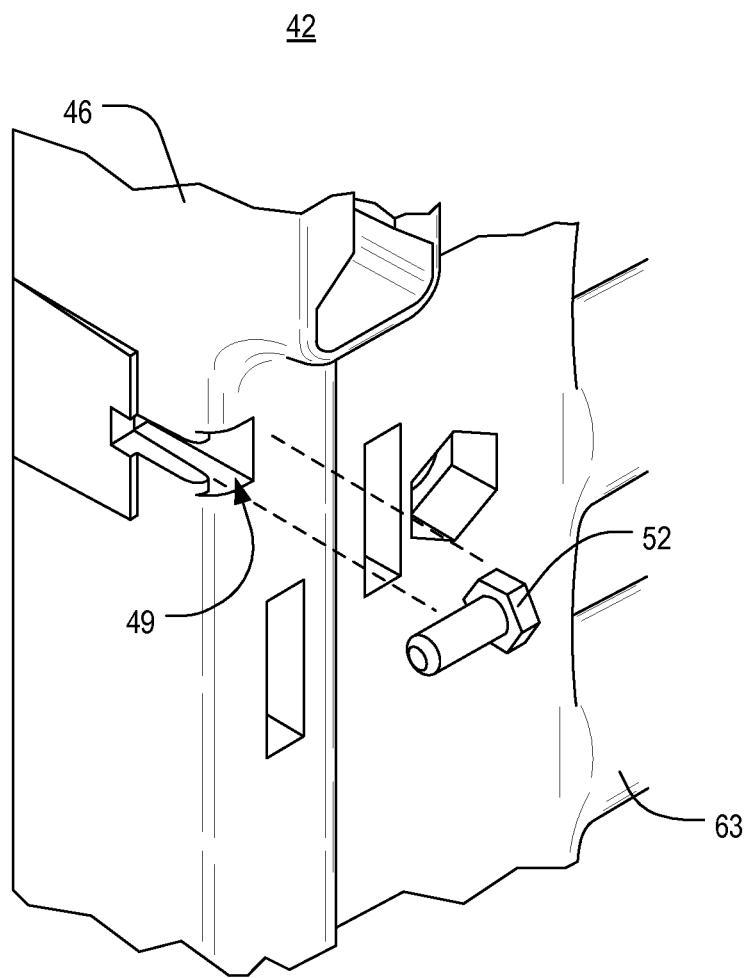
FIGS. 26 and 27 are fragmentary isometric views of a portion of the rear of one of the side cable guides of FIG. 4.
Figure 27:
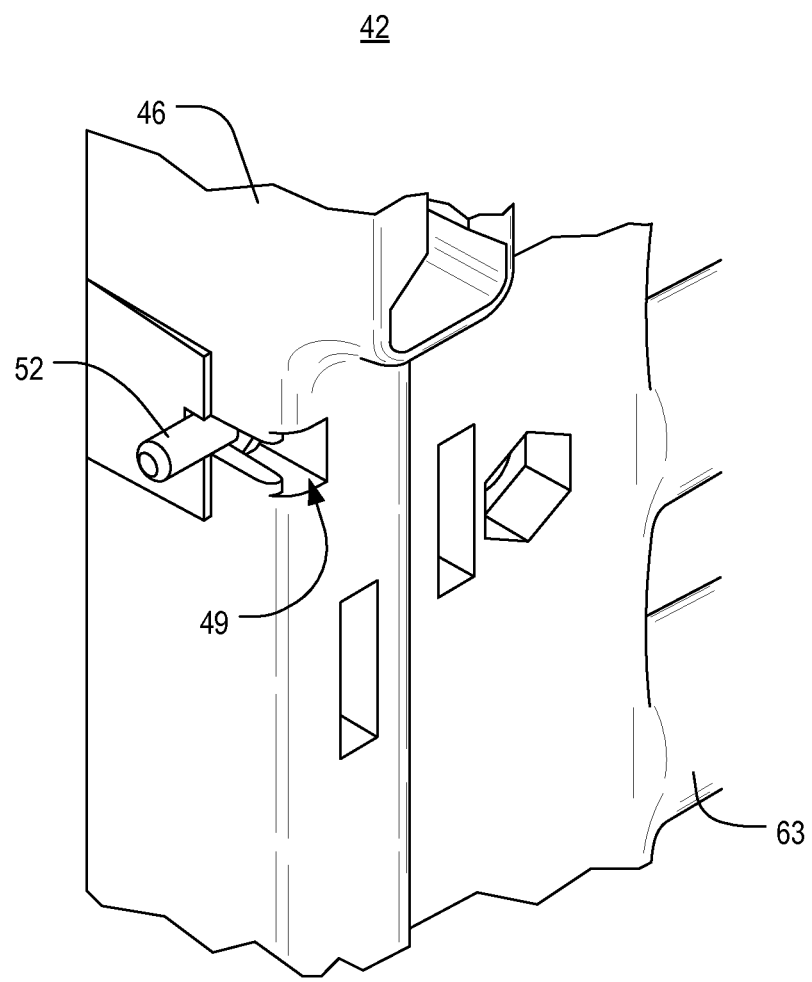
Figure 28:
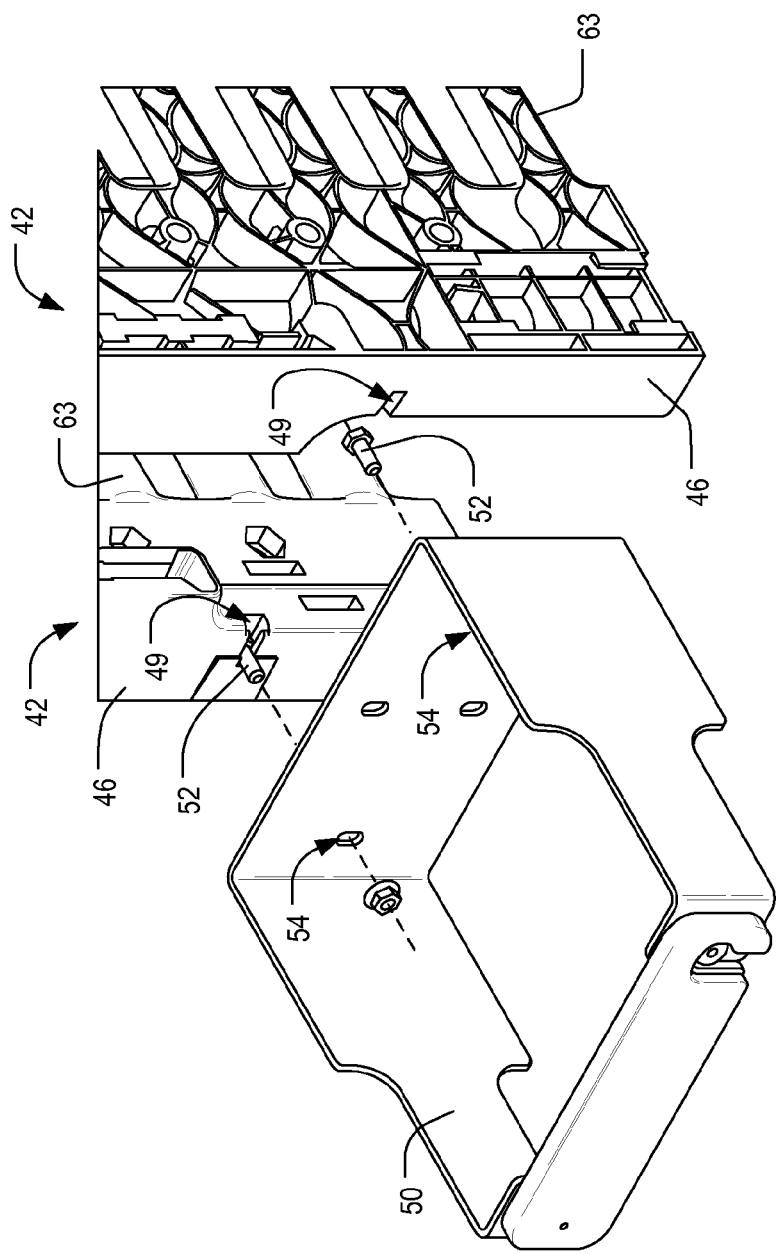
FIG. 28 is a fragmentary isometric view of a cable management accessory being attached to a pair of side cable guides.
Figure 29:
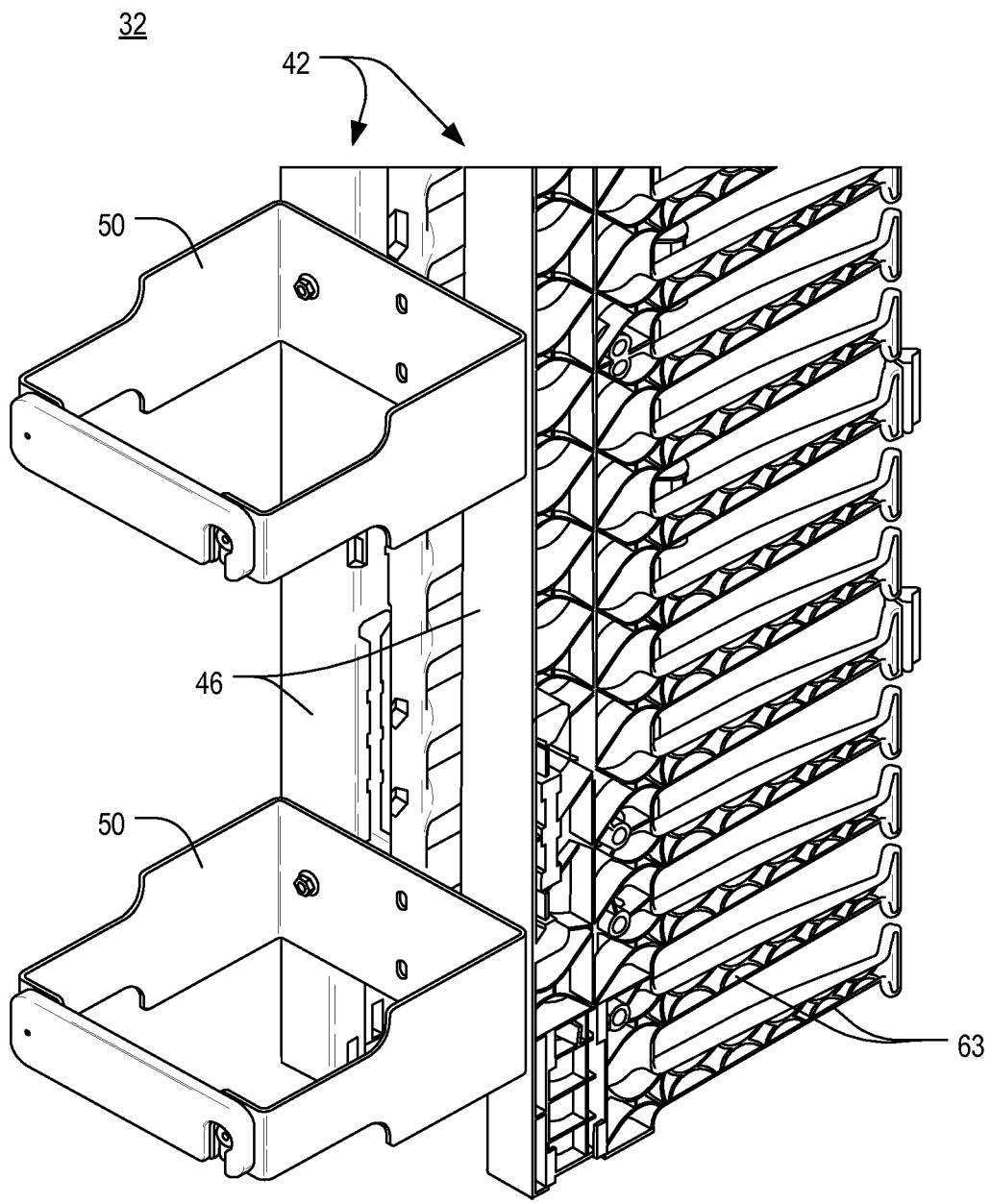
FIG. 29 is a fragmentary isometric view of two such cable management accessories mounted on the pair of side cable guides of FIG. 28.

Returning to FIG. 5, the rear accessory mounting holes 49 make it possible to quickly and easily connect additional accessories to the rear of the single-sided vertical cable manager units 32. FIGS. 26 and 27 are fragmentary isometric views of a portion of the rear of one of the side cable guides 42 of FIG. 4, while FIG. 28 is a fragmentary isometric view of a cable management accessory 50 being attached to a pair of side cable guides 42, and FIG. 29 is a fragmentary isometric view of two such cable management accessories 50 mounted on the pair of side cable guides 42 of FIG. 28. As perhaps best seen in FIGS. 26 and 27, the rear accessory mounting hole is a slot of T-shaped cross section that is arranged in the body of the vertical support column 46 and open to the side such that the head of a bolt 52 may be inserted into the slot in such a way that the shank of the bolt 52 protrudes from the rear of the column 46. When used with a hex-headed bolt 52 of the proper size, the head of the bolt 52 is restrained from turning when it is retained in the slot. Thus, as shown in FIG. 28, bolts 52 may be inserted into the mounting holes 49 on a pair of cable guides 42 such that their respective shanks may be used to mount an accessory 50, such as a conventional cable ring, on the rear of the cable manager 30. As shown in FIG. 29, a plurality of such accessories 50 may be attached in a column, thereby enhancing the cable management capabilities of the assembly.

Advantageously, the accessory mounting holes 49, which may be molded into the side cable guides 42 in an injection molding process, permit accessories 50 to be attached quickly and easily by requiring only a single tool, rather than two, to manipulate the bolt 52. This is because the head of the bolt 52 is imprisoned in the hole 49 and need not be restrained from turning with a separate tool. Furthermore, for an accessory 50 like the cable ring shown in FIGS. 28 and 29, the spacing of the apertures 54 in the ring 50 prevents the bolts 52 from sliding out of the holes 49 once their shanks have been inserted through the apertures 54.

It will be appreciated that other accessories may be substituted for the cable rings shown in FIGS. 28 and 29.

Figure 30:
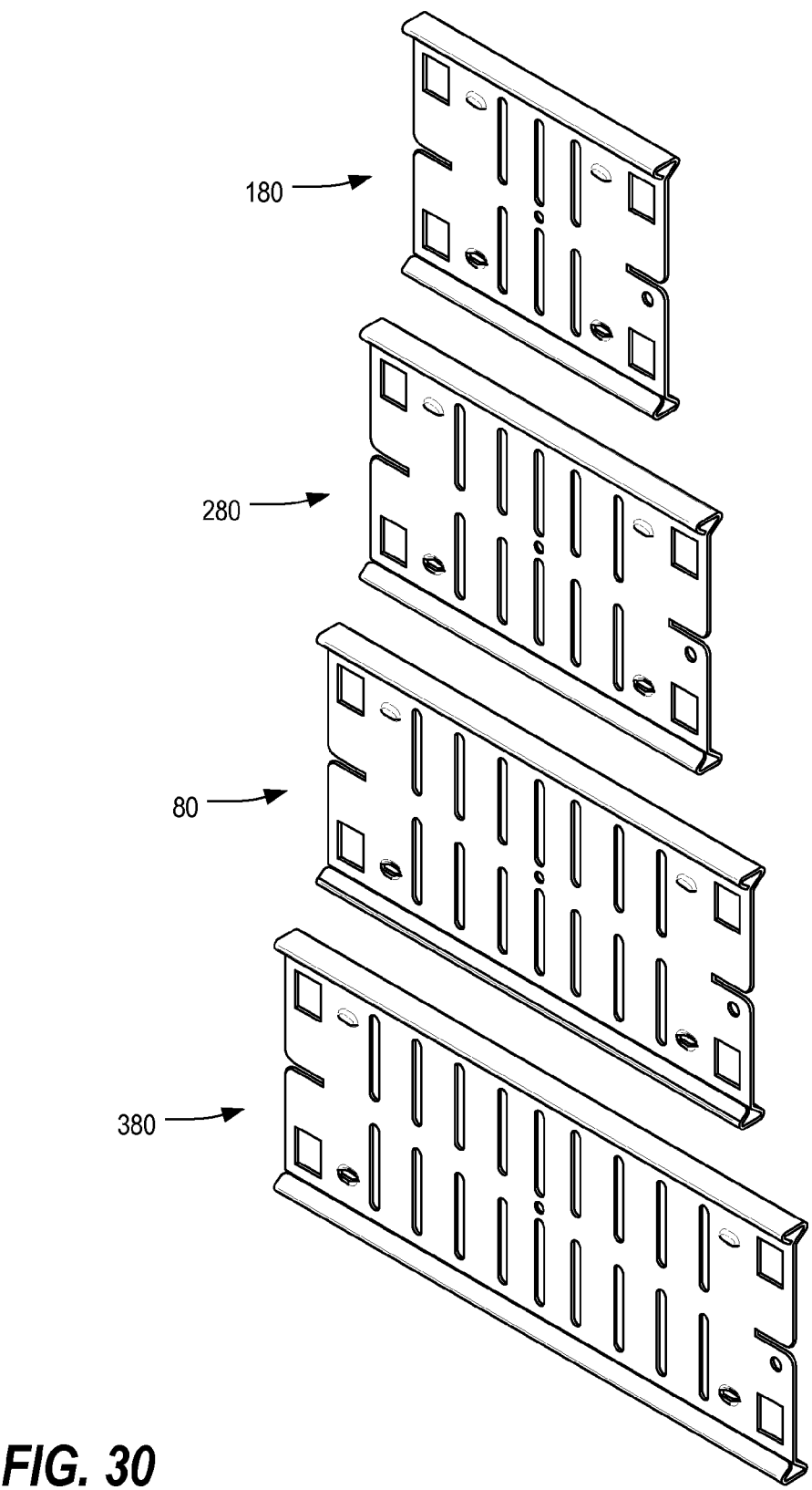
FIG. 30 is an isometric view of a set of four midsection members of different lengths.

The modular construction of the vertical cable manager units permits cable managers of a variety of dimensions to be constructed from a limited number of part sizes. Cable manager units 32 of multiple different widths may be constructed using the same side cable guides 32 by substituting midsection members 80 of different lengths. FIG. 30 is an isometric view of a set of four midsection members 80,180,280,380 of different lengths, which in one commercial embodiment may include lengths of 6 inches, 8 inches, 10 inches and 12 inches. The third of these lengths (i.e., the 10-inch version) is featured in the vertical cable manager 30 of FIGS. 2A, 3 and 4, while the smallest of these lengths (i.e., the 6-inch version) is featured in the vertical cable manager 130 of FIG. 33, discussed below. Other widths are likewise possible as well. It will be appreciated, of course, that the width of the door 38 must likewise be changed, although as described previously, when the composite door structure is utilized, only the center panel 70 needs to be changed; the edge pieces 71 are usable with any width center panel 70.

Figure 31:
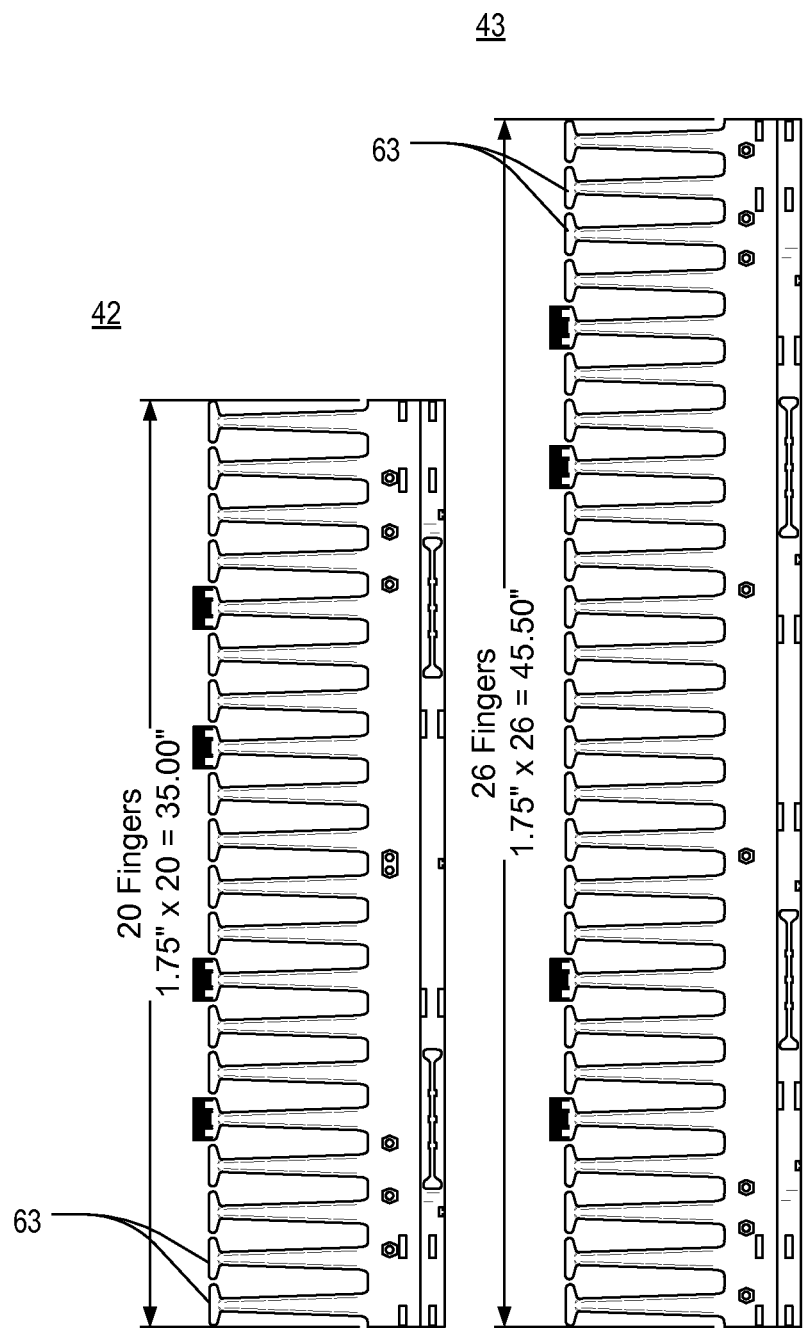
FIG. 31 is a side plan view of a set of two side cable guides of different lengths.
Figure 32:
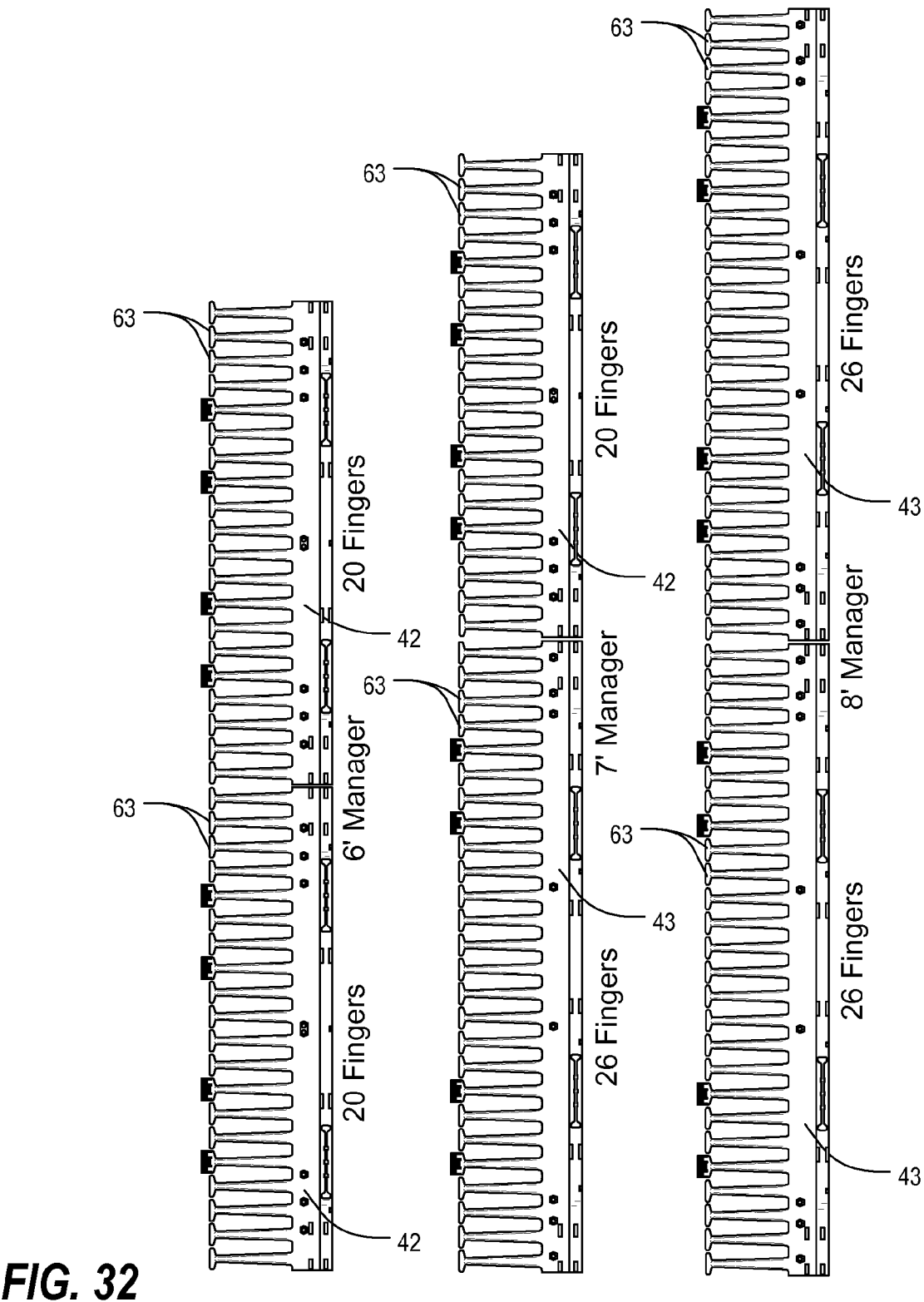
FIG. 32 is a side plan view of a three different pairs of side cable guides representing three different cable manager heights (lengths)

Cable managers 30 of multiple different heights (lengths) may likewise be constructed using the same midsection members 80 by substituting side cable guides 32 of different lengths. FIG. 31 is a side plan view of a set of two side cable guides 42,43 of different lengths, which in one commercial embodiment may include lengths of 36 inches (3 feet) and 42 inches (3.5 feet). When arranged on the basis of standard RMUs, as described previously, the 36-inch length includes twenty T-shaped projections ("fingers") 63 and the 42-inch length includes twenty-six T-shaped projections ("fingers") 63. Thus, cable managers of either 36 inches or 42 inches may be created using only a single cable manager unit 32, depending on which length is chosen. In addition, however, cable managers 30 of at least three different standardized lengths may be created by pairing two cable manager units 32. FIG. 32 is a side plan view of a three different pairs of side cable guides representing three different cable manager heights (lengths). The pairing on the left is of two 36-inch lengths (6 feet total); the pairing in the center is of one 36-inch length and one 42-inch length (7 feet total); and the pairing on the right is of two 42-inch lengths (8 feet total).

It will be further appreciated that any of a variety of cable management accessories (not shown) may be installed in a cable manager unit 32 by mounting them to the midsection members 80. Examples of such accessories are described and illustrated, for example, in U.S. Patent Application Publication No. US 2009/0236117 A1.

The various features described above contribute to a cable manager 30 that is fast to assemble, requires minimal tools to assemble, and makes a small packaging footprint. The mounting of the cable manager 30 to a rack 20 is faster since it requires only a single wrench; the mounting bolts are prevented from rotating by hex shaped holes 45 in the side cable guides 42.

Figure 33:
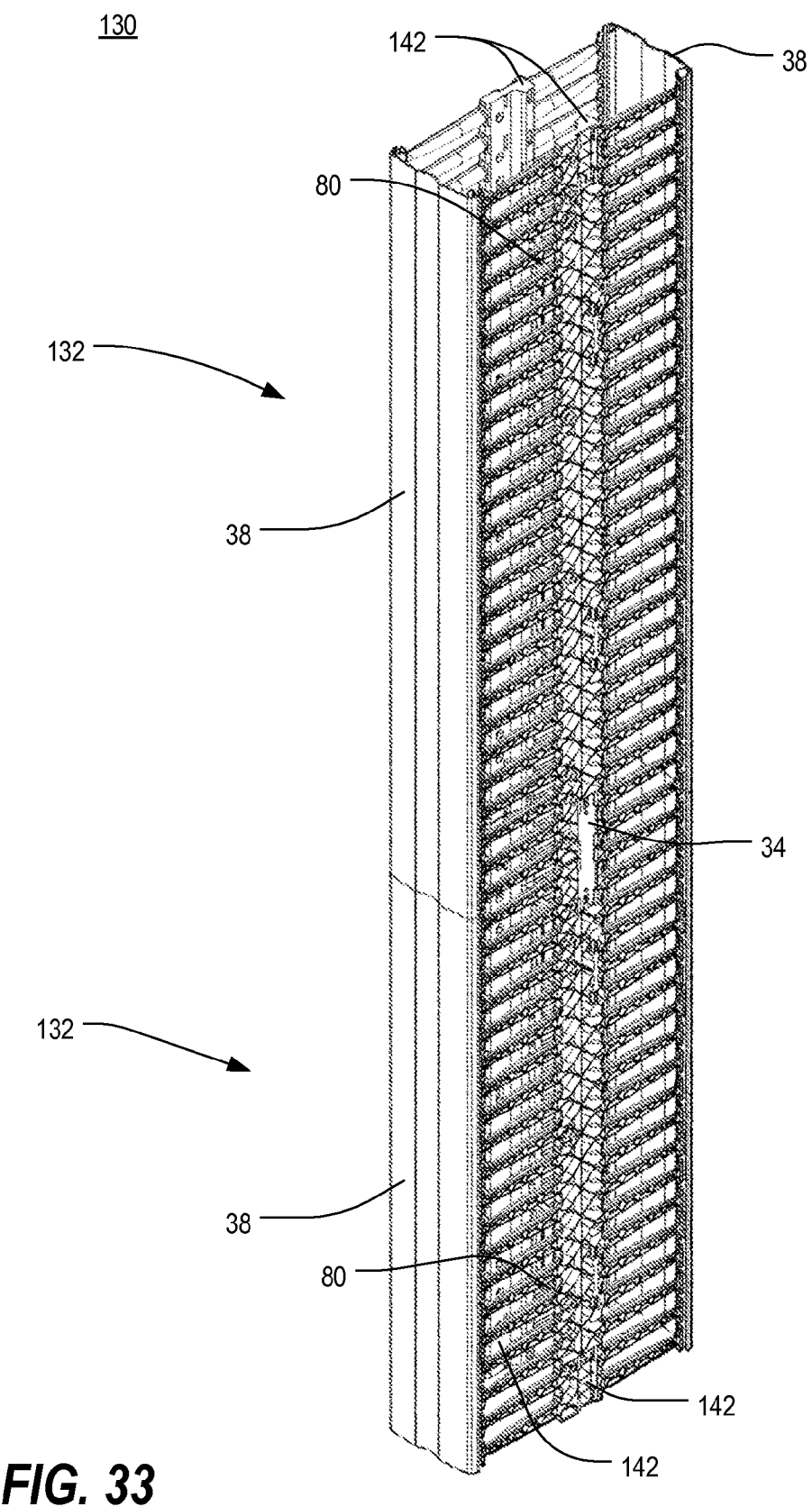
FIG. 33 is an isometric view of a double-sided vertical cable manager in accordance with one or more preferred embodiments of the present invention.

The cable manager units and resulting cable managers described so far are "single-sided" cable managers in that they include T-shaped projections extending only in one direction, and thus comprise only one vertical cable trough for routing cables on either the front or back of the rack 10. FIG. 33 is an isometric view of a double-sided vertical cable manager 130 in accordance with one or more preferred embodiments of the present invention. Like the single-sided cable manager 30, the double-sided vertical cable manager 130 includes one or more vertical cable manager units 132, each including a pair of side cable guides 142 and one or more midsection members 80. The cable manager units 132 may have the same or different heights. In FIG. 33, two cable manager units 132 are shown, each with a different height. The double-sided cable manager also includes two doors 38, rather than one, because it includes two vertical cable troughs. Two or more vertical cable manager units 132 may be interconnected using a pair of splice plates 34.

The various components of the double-sided cable manager units 132 are similar to those of the single-sided units 32 except that the side cable guides 142 include T-shaped projections 63 extending both forwardly and rearwardly. Advantages and uses of a double-sided vertical cable manager are similar to those described in U.S. Patent Application Publication No. US 2009/0236117 A1. The side cable guides 142 also fail to include rear accessory mounting holes 49.

As described herein, the invention is disclosed in a vertical orientation. However, it will be appreciated that all or part of the invention as described herein may be implemented in a horizontal orientation. For example, it is contemplated that the cable manager as described herein may be implemented for use in a horizontal orientation.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A cable manager comprising one or more cable manager units, each having:
   (a) a pair of side cable guides, each comprised of a plurality of generally T-shaped projections, each having a shaft and a crosspiece, extending forwardly from a support column;
   (b) at least one hinge boss on each of the pair of side cable guides, the at least one hinge boss being disposed at the end of one of the generally T-shaped projections;
   (c) a door, having a center panel and a hinge structure along edges thereof to receive one or more of the hinge bosses, thereby facilitating rotatable attachment of the door to the side cable guides; and
   (d) a seperate midsection member for interconnecting the pair of side cable guides, wherein the midsection member is adapted to be received in sockets arranged in the pair of side cable guides;
   (e) wherein the door is adapted to be opened along either side thereof by detaching the hinge structure from the at least one hinge boss at one side of the door and rotating the door about another at least one hinge boss at the opposite side of the door; and
   (f) wherein the hinge structure includes a stop adapted to bear against the at least one hinge boss, thereby preventing the door from becoming misaligned with the pair of side cable guides.

2. The cable manager of claim 1, wherein each socket has a large taper such that the width of an entrance thereof is wider than the width of the midsection member and the interior of the socket is narrower than the entrance.

3. The cable manager of claim 1, wherein the midsection member includes a web having flanges at opposite sides thereof.

4. The cable manager of claim 1, wherein the flanges each have a closed profile.

5. The cable manager of claim 1, wherein the web includes at least one alignment slot at an end thereof and extending inwardly, the alignment slot being adapted to fit over a shelf in each socket.

6. The cable manager of claim 1, wherein the web includes at least one alignment boss disposed at or near an end thereof for positioning the midsection member laterally within each socket.

7. The cable manager of claim 1, wherein the web includes at least one locking aperture disposed at or near an end thereof for engagement with a locking tab within each socket, thereby retaining the midsection member therein.

8. The cable manager of claim 7, wherein the locking tab is beveled to permit the midsection member to be snap fit.

9. The cable manager of claim 8, wherein the midsection member is removable from the each socket by depressing the corresponding locking tab.

\* \* \* \* \*